United States Patent
Gamsizlar et al.

(10) Patent No.: US 12,491,358 B2
(45) Date of Patent: Dec. 9, 2025

(54) UNIVERSAL HOLDER SYSTEM

(71) Applicant: MAQUET CARDIOPULMONARY GMBH, Rastatt (DE)

(72) Inventors: Ömer Gamsizlar, Rastatt (DE); Katrin Gernert, Rastatt (DE); Achim Krausemann, Karlsruhe (DE); Jens Schröter, Karlsbad (DE); Thomas Garweg, Radevormwald (DE)

(73) Assignee: Maquet Cardiopulmonary GmbH, Rastatt (DE)

( * ) Notice: Subject to any disclaimer, the term of this patent is extended or adjusted under 35 U.S.C. 154(b) by 421 days.

(21) Appl. No.: 18/022,364

(22) PCT Filed: Aug. 16, 2021

(86) PCT No.: PCT/EP2021/072707
§ 371 (c)(1),
(2) Date: Feb. 21, 2023

(87) PCT Pub. No.: WO2022/038085
PCT Pub. Date: Feb. 24, 2022

(65) Prior Publication Data
US 2023/0310837 A1    Oct. 5, 2023

Related U.S. Application Data

(60) Provisional application No. 63/067,749, filed on Aug. 19, 2020.

(51) Int. Cl.
*A61M 60/585* (2021.01)
*A61M 1/16* (2006.01)
*A61M 60/113* (2021.01)
*A61M 60/232* (2021.01)
*A61M 60/38* (2021.01)

(52) U.S. Cl.
CPC ........ *A61M 60/585* (2021.01); *A61M 1/1698* (2013.01); *A61M 60/113* (2021.01); *A61M 60/232* (2021.01); *A61M 60/38* (2021.01); *A61M 2209/082* (2013.01)

(58) Field of Classification Search
CPC  A61M 60/585; A61M 1/1698; A61M 60/113; A61M 60/232; A61M 60/38; A61M 2209/082; A61M 60/109; A61M 60/845; A61M 1/3666; A61B 90/50
See application file for complete search history.

(56) References Cited

U.S. PATENT DOCUMENTS

2005/0063860 A1* 3/2005 Carpenter ............ A61M 60/113
604/4.01
2011/0147550 A1* 6/2011 Wendler ................ A61B 90/57
29/428

* cited by examiner

Primary Examiner — Leslie R Deak

(57) ABSTRACT

A holder system capable of mounting at least one medical device component to a control console support includes a triplex holder arm configured to connect to and support at least one medical device component; a receiver or receiver arm assembly configured to connect to the triplex holder arm, wherein the receiver is attached to the control console support to mount the triplex holder arm and the at least one medical device component on the control console support; and a locking assembly configured to releasably connect the triplex holder arm to the receiver or receiver arm assembly.

12 Claims, 15 Drawing Sheets

UNIVERSAL HOLDER SYSTEM

CROSS REFERENCE TO RELATED APPLICATIONS

The present application is a national stage application of International Application No. PCT/EP2021/072707, filed Aug. 16, 2021 which claims the benefit of U.S. Provisional Patent Application No. 63/067,749, filed Aug. 19, 2020, the disclosure of which are incorporated by reference in its entirety.

BACKGROUND OF THE DISCLOSURE

Field of the Disclosure

The present disclosure relates to a system for holding medical device components, and more particularly, to a holding system that holds one or more medical device components on a mobile support for ease of transportation.

Description of the Related Technology

The intra-hospital transport of patients connected to life support equipment, such as extracorporeal membrane oxygenation (ECMO) equipment for pumping and oxygenating a patient's blood, can be a tremendous challenge for medical personnel due to limited space available in elevators, in treatment and diagnostic rooms or in facilities such as computerized tomography (CT) scans, and when passing through doors. Prior solutions have provided for a control console and components, such as pump drives and life support components/oxygenators, to be connected to a patient lying on a bed or gurney during patient care. However, these solutions do not provide a common mounting option for components necessary for patient care in appropriate physical relation with respect to each other, the console, and the patient on the bed or the gurney.

In particular, prior solutions include providing transport carts for supporting and transporting the life support equipment with the patient. The transport carts may incorporate mounting systems, for instance vertical tubes and horizontal rails, for mounting of the equipment components on the cart. Such transport carts can be infeasible, impractical or difficult to use in certain hospitals or facilities due to their size and may present a degree of risk to the patient, medical personnel, and/or others present in the hospital or facility. For instance, if the patient had to be brought to the CT facilities, the transport of the patient could be difficult or impossible because the bed (or gurney) and the cart may not fit in the same elevator. Handling can become very complicated because life support equipment cannot be disconnected from the patient and cannot be attached in appropriate positions.

Furthermore, prior solutions were designed in a manner that the individual components of the life support equipment, such as the pump drives or oxygenator, can be accommodated in individual holders. These solutions do not provide handling of the components together in a unified manner. This makes rearrangement of the components more difficult because these components are also connected to one another with sections of tubing and/or with communications wires. Accordingly, several medical personnel may be required to assist in movement of the patient and the cart supporting the life support equipment so that the connected components can be used simultaneously. Such movement can be complicated and dangerous, since several storage locations, the complicated routing of tubes and wires, and the cooperation of several medical personnel must harmonize and be carried out synchronously. Previous solutions for mounting such components together are bulky and difficult to handle.

SUMMARY OF THE DISCLOSURE

According to a particular example of the present disclosure, a holder system for mounting at least one medical device component to a support is provided. The holder system comprises a triplex holder arm configured to connect to and support at least one medical device component; a receiver configured to connect to the triplex holder arm, wherein the receiver is attached to the control console support to mount the triplex holder arm and the at least one medical device component on the control console support; and a locking assembly configured to releasably connect the triplex holder arm to the receiver.

According to an example, the locking assembly comprises a latch disposed within the receiver and a recess formed in the receiver and a moveable latching arm operably coupled to move the latch. The holder arm comprises a protrusion at an end thereof configured to be inserted into the recess. The latching arm is movable to engage and disengage the protrusion on the holder arm via the latch when the protrusion is received within the recess to lock the holder arm in a connection with the receiver and release the holder arm from the receiver by moving the latching arm between a first position and a second position.

According to an example, the locking assembly comprises a latch disposed within the holder arm. The latch is moveable between a first position and a second position so as to engage a protrusion disposed on the receiver to lock the holder arm in a connection with the receiver and to release the holder arm from the receiver.

According to an example, the locking assembly comprises a first part disposed on an end of the holder arm, a second part, and at least one fastener configured to connect the first part to the second part. The first part and the second part are configured to be fastened together around the receiver so as to grip the receiver.

The receiver may comprise a handle or handgrip disposed on the control console.

According to an example, the at least one medical device component comprises a first medical device component and a second medical device component. The first medical device component constitutes a drive for a medical blood pump and the second medical device component constitutes an oxygenator operably connected to receive blood pumped from the medical blood pump. The control console support is operably connected to the medical control pump so as to control the medical blood pump.

According to an example, the triplex holder arm comprises a first receptacle configured to connect the medical blood pump to the triplex holder arm and a second receptacle configured to connect the oxygenator to the triplex holder arm.

According to an example, the triplex holder arm comprises a first arm portion configured to engage with the locking assembly, a second arm portion extending from the first arm portion and configured to connect to the medical blood pump, and a third arm portion extending from the first arm portion and configured to connect to the oxygenator, wherein the triplex holder arm is configured to maintain a relative position between the two medical device components suitable for patient transport.

The second receptacle may be oriented downwards and connect to an upper portion of the oxygenator so the oxygenator hangs below the second receptacle, and the first receptacle may be oriented laterally so as to be perpendicular, or nearly perpendicular, to the second receptacle and connect to a side portion of the medical blood pump so the medical blood pump hangs from the second arm portion.

According to a particular example of the present disclosure, a holder system capable of mounting at least a medical blood pump and an oxygenator to a support is provided. The holder system comprises a triplex holder arm configured to connect to and support the medical blood pump and the oxygenator, wherein the medical blood pump is connected to pump blood to the oxygenator; a receiver configured to connect to the triplex holder arm, wherein the receiver is attached to the support to mount the triplex holder arm and the medical blood pump and the oxygenator on the support; and a locking assembly configured to releasably connect the triplex holder arm to the receiver. The receiver comprises a receiver arm assembly that comprises a clamp assembly on one end of the receiver arm assembly configured to releasably connect the receiver arm assembly to the support; a latch housing incorporating the locking assembly disposed on an opposite end of the receiver arm assembly, wherein the locking assembly comprises a latch disposed within the latch housing; and at least one joint movably connecting ends of the receiver arm assembly.

According to an example the locking assembly comprises a recess formed in the latch housing and a moveable latching arm operably connected to move the latch. The triplex holder arm comprises a protrusion at an end thereof configured to be inserted into the recess of the latch housing. The latching arm is movable between a first position and a second position to engage and disengage the protrusion on the triplex holder arm by movement of the latch when the protrusion is received within the recess to lock the triplex holder arm in a connection with the receiver arm assembly and to release the triplex holder arm from the receiver arm assembly.

According to an example, the triplex holder arm comprises a first receptacle configured to connect the medical blood pump to the triplex holder arm and a second receptacle configured to connect the oxygenator to the triplex holder arm.

According to an example, the triplex holder arm comprises a first arm portion configured to engage with the locking assembly, a second arm portion extending from the first arm portion and configured to connect to the medical blood pump, and a third arm portion extending from the first arm portion and configured to connect to the oxygenator. The triplex holder arm is configured to maintain a relative position between the two medical device components suitable for patient transport.

The second receptacle may be oriented downwards and connect to an upper portion of the oxygenator so the oxygenator hangs below the second receptacle, and the first receptacle may be oriented laterally so as to be perpendicular, or nearly perpendicular, to the second receptacle and connect to a side portion of the medical blood pump so the medical blood pump hangs from the second arm portion.

The support may comprise a cart.

According to a particular example of the present disclosure, a portable medical device system is provided. The portable medical device system comprises at least a first medical device component and a second medical device component; a medical device control console configured to transmit control communication to, and to receive sensor and data feedback from, at least one of the first medical device component and the second medical device component; and a holder system configured to mount the first medical device component and the second medical device component to the medical device control console. The holder system comprises a holder arm configured to releasably connect to the first medical device component and the second medical device component; a receiver configured to connect to the holder arm, wherein the receiver is attached to the medical device control console; and a locking assembly configured to releasably connect the holder arm to the receiver.

According to an example, the locking assembly comprises a latch disposed within the receiver, a recess formed in the receiver and a moveable latching arm operably connected to move the latch. The holder arm comprises a protrusion at an end thereof configured to be inserted into the recess. The latching arm is movable to engage and disengage the protrusion on the holder arm via the latch when the protrusion is received within the recess to lock the holder arm in a connection with the receiver and release the holder arm from the receiver by moving the latching arm between a first position and a second position.

According to an example, the locking assembly comprises a latch disposed within the holder arm. The latch is moveable between a first position and a second position so as to engage a protrusion disposed on the receiver to lock the holder arm in a connection with the receiver and to release the holder arm from the receiver.

According to an example, the locking assembly comprises a first part disposed on an end of the holder arm, a second part, and at least one fastener configured to connect the first part to the second part. The first part and the second part are configured to be fastened together around the receiver so as to grip the receiver.

The receiver may comprise a handle or handgrip attached to the control console.

The first medical device component may comprise a medical blood pump and the second medical device component may comprise an oxygenator.

According to an example, holder arm has a triplex configuration and comprises a first receptacle configured to connect the first medical device component to the holder arm and a second receptacle configured to connect the second medical device component to the holder arm.

According to an example, the triplex holder arm comprises a first arm portion configured to engage with the locking assembly, a second arm portion extending from the first arm portion and configured to connect to the first medical device component, and a third arm portion extending from the first arm portion and configured to connect to the second medical device component. The triplex holder arm is configured to maintain a relative position between the first medical device component and the second medical device component suitable for patient transport.

The second receptacle may be oriented downwards and connect to an upper portion of the second medical device component so the second medical device component hangs below the second receptacle, and the first receptacle may be oriented laterally so as to be perpendicular, or nearly perpendicular, to the second receptacle and connect to a side portion of the first medical device component so the first medical device component hangs from the second arm portion.

According to an example, the holder arm comprises a first arm portion configured to engage with the locking assembly, a second arm portion extending from the first arm portion configured to connect to one of the two medical device components, and a third arm portion extending from the first arm portion configured to connect to another of the two medical device components. The holder arm is configured to maintain a relative position between the two medical device components suitable for placing the two medical device components in fluid communication with each other via one or more sections of tubing and/or for placing the two medical device components in electrical communication with each other and/or for placing the two medical device components in electrical communication with the medical device control console via one or more communications wires.

According to an example, the holder arm has a multiplex configuration.

According to an example, the triplex holder arm includes a tube guide configured to hold tubing connecting the medical blood pump to the oxygenator.

According to an example, a holder system capable of mounting at least one medical device component to a control console support may include a triplex holder arm configured to connect to and support at least one medical device component, a receiver configured to connect to the triplex holder arm, wherein the receiver is attached to the control console support to mount the triplex holder arm and the at least one medical device component on the control console support, and a locking assembly configured to releasably connect the triplex holder arm to the receiver, wherein a central longitudinal axis of the at least one medical component is positioned within a length of the control console support that extends from a front side of the control console support to a rear end of the control console support.

According to one example, the central longitudinal axis of the at least one medical component may extend from a bottom surface of the at least one medical component to a top surface of the at least one medical component. The at least one medical component may include a first medical component and a second medical component, wherein the first medical component defines a first central longitudinal axis and the second medical component defines a second central longitudinal axis, wherein the first central longitudinal axis and the second central longitudinal axis are positioned within the length of the control console support. A distance between the first central longitudinal axis and the second central longitudinal axis may range from 193 millimeters to 281 millimeters. The distance between the first central longitudinal axis and the second central longitudinal axis may be 241 millimeters. A distance between the first central longitudinal axis and an outer housing of the control console support may range from 40 millimeters to 60 millimeters. A distance between the second central longitudinal axis and the outer housing of the control console support may range from 85 millimeters to 103 millimeters. A distance between an outer housing of the first medical component and the outer housing of the control console support may range from 1 millimeters to 10 millimeters. A distance between an outer housing of the second medical component and the outer housing of the control console support may range from 1 millimeters to 10 millimeters. The holder system may be operatively connected to a sprinter cart.

The present invention is also described in the following clauses:

Clause 1: A holder system capable of mounting at least one medical device component to a control console support, comprising: a triplex holder arm configured to connect to and support at least one medical device component; a receiver configured to connect to the triplex holder arm, wherein the receiver is attached to the control console support to mount the triplex holder arm and the at least one medical device component on the control console support; and a locking assembly configured to releasably connect the triplex holder arm to the receiver.

Clause 2: The holder system according to Clause 1, wherein the locking assembly comprises a latch disposed within the receiver and a recess formed in the receiver and a moveable latching arm operably coupled to move the latch, wherein the holder arm comprises a protrusion at an end thereof configured to be inserted into the recess, and wherein the latching arm is movable to engage and disengage the protrusion on the holder arm via the latch when the protrusion is received within the recess to lock the holder arm in a connection with the receiver and release the holder arm from the receiver by moving the latching arm between a first position and a second position.

Clause 3: The holder system according to Clause 1 or Clause 2, wherein the locking assembly comprises a latch disposed within the holder arm, wherein the latch is moveable between a first position and a second position so as to engage a protrusion disposed on the receiver to lock the holder arm in a connection with the receiver and to release the holder arm from the receiver.

Clause 4: The holder system according to any of Clauses 1-3, wherein the locking assembly comprises a first part disposed on an end of the holder arm, a second part, and at least one fastener configured to connect the first part to the second part, and wherein the first part and the second part are configured to be fastened together around the receiver so as to grip the receiver.

Clause 5: The holder system according to any one of Clauses 1-4, wherein the receiver comprises a handle or handgrip disposed on the control console.

Clause 6: The holder system according to any one of Clauses 1-5, wherein the at least one medical device component comprises a first medical device component and a second medical device component, wherein the first medical device component constitutes a drive for a medical blood pump and the second medical device component constitutes an oxygenator operably connected to receive blood pumped from the medical blood pump, and the control console support is operably connected to the medical control pump so as to control the medical blood pump.

Clause 7: The holder system according to Clause 6, wherein the triplex holder arm comprises a first receptacle configured to connect the medical blood pump to the triplex holder arm and a second receptacle configured to connect the oxygenator to the triplex holder arm.

Clause 8: The holder system according to any one of Clauses 1-7, wherein the triplex holder arm comprises a first arm portion configured to engage with the locking assembly, a second arm portion extending from the first arm portion and configured to connect to the medical blood pump, and a third arm portion extending from the first arm portion and configured to connect to the oxygenator, wherein the triplex holder arm is configured to maintain a relative position between the two medical device components suitable for patient transport.

Clause 9: The holder system according to Clause 8, wherein the second receptacle is oriented downwards and connects to an upper portion of the oxygenator so the oxygenator hangs below the second receptacle, and the first receptacle is oriented laterally so as to be perpendicular, or nearly perpendicular, to the second receptacle and connects to a side portion of the medical blood pump so the medical blood pump hangs from the second arm portion.

Clause 10: A holder system capable of mounting at least a medical blood pump and an oxygenator to a support, comprising: a triplex holder arm configured to connect to and support the medical blood pump and the oxygenator, wherein the medical blood pump is connected to pump blood to the oxygenator; a receiver configured to connect to the triplex holder arm, wherein the receiver is attached to the support to mount the triplex holder arm and the medical blood pump and the oxygenator on the support; and a locking assembly configured to releasably connect the triplex holder arm to the receiver, wherein the receiver comprises a receiver arm assembly that comprises a clamp assembly on one end of the receiver arm assembly configured to releasably connect the receiver arm assembly to the support; a latch housing incorporating the locking assembly disposed on an opposite end of the receiver arm assembly, wherein the locking assembly comprises a latch disposed within the latch housing; and at least one joint movably connecting ends of the receiver arm assembly.

Clause 11: The holder system according to Clause 10, wherein the locking assembly comprises a recess formed in the latch housing and a moveable latching arm operably connected to move the latch, wherein the triplex holder arm comprises a protrusion at an end thereof configured to be inserted into the recess of the latch housing, and wherein the latching arm is movable between a first position and a second position to engage and disengage the protrusion on the triplex holder arm by movement of the latch when the protrusion is received within the recess to lock the triplex holder arm in a connection with the receiver arm assembly and to release the triplex holder arm from the receiver arm assembly.

Clause 12: The holder system according to Clause 10 or Clause 11, wherein the triplex holder arm comprises a first receptacle configured to connect the medical blood pump to the triplex holder arm and a second receptacle configured to connect the oxygenator to the triplex holder arm.

Clause 13: The holder system according to any one of Clauses 10-12, wherein the triplex holder arm comprises a first arm portion configured to engage with the locking assembly, a second arm portion extending from the first arm portion and configured to connect to the medical blood pump, and a third arm portion extending from the first arm portion and configured to connect to the oxygenator, wherein the triplex holder arm is configured to maintain a relative position between the two medical device components suitable for patient transport.

Clause 14: The holder system according to Clause 12 or Clause 13, wherein the second receptacle is oriented downwards and connects to an upper portion of the oxygenator so the oxygenator hangs below the second receptacle, and the first receptacle is oriented laterally so as to be perpendicular, or nearly perpendicular, to the second receptacle and connects to a side portion of the medical blood pump so the medical blood pump hangs from the second arm portion.

Clause 15: The holder system according to any one of Clauses 10-14, wherein the support comprises a cart.

Clause 16: The holder system according to any one of claims 10-15, wherein the triplex holder arm comprises a tube guide configured to hold tubing connecting the medical blood pump to the oxygenator.

Clause 17: A portable medical device system comprising: at least a first medical device component and a second medical device component; a medical device control console configured to transmit control communication to, and to receive sensor and data feedback from, at least one of the first medical device component and the second medical device component; and a holder system configured to mount the first medical device component and the second medical device component to the medical device control console, the holder system comprising a holder arm configured to releasably connect to the first medical device component and the second medical device component; a receiver configured to connect to the holder arm, wherein the receiver is attached to the medical device control console; and a locking assembly configured to releasably connect the holder arm to the receiver.

Clause 18: The portable medical device system according to Clause 17, wherein the locking assembly comprises a latch disposed within the receiver, a recess formed in the receiver and a moveable latching arm operably connected to move the latch, wherein the holder arm comprises a protrusion at an end thereof configured to be inserted into the recess, and wherein the latching arm is movable to engage and disengage the protrusion on the holder arm via the latch when the protrusion is received within the recess to lock the holder arm in a connection with the receiver and release the holder arm from the receiver by moving the latching arm between a first position and a second position.

Clause 19: The portable medical device system according to Clause 17 or Clause 18, wherein the locking assembly comprises a latch disposed within the holder arm, wherein the latch is moveable between a first position and a second position so as to engage a protrusion disposed on the receiver to lock the holder arm in a connection with the receiver and to release the holder arm from the receiver.

Clause 20: The portable medical device system according to any of Clauses 17-19, wherein the locking assembly comprises a first part disposed on an end of the holder arm, a second part, and at least one fastener configured to connect the first part to the second part, and wherein the first part and the second part are configured to be fastened together around the receiver so as to grip the receiver.

Clause 21: The portable medical device system according to any one of Clauses 17-20, wherein the receiver comprises a handle or handgrip attached to the control console.

Clause 22: The portable medical device system according to any one of Clauses 17-21, wherein the first medical device component comprises a medical blood pump and the second medical device component comprises an oxygenator.

Clause 23: The portable medical device system according to any one of Clauses 17-22, wherein the holder arm has a triplex configuration and comprises a first receptacle configured to connect the first medical device component to the holder arm and a second receptacle configured to connect the second medical device component to the holder arm.

Clauses 24: The portable medical device system according to Clause 23, wherein the triplex holder arm comprises a first arm portion configured to engage with the locking assembly, a second arm portion extending from the first arm portion and configured to connect to the first medical device component, and a third arm portion extending from the first arm portion and configured to connect to the second medical device component, wherein the triplex holder arm is configured to maintain a relative position between the first medical device component and the second medical device component suitable for patient transport.

Clause 25: The portable medical device system according to Clause 23 or Clause 24, wherein the second receptacle is oriented downwards and connects to an upper portion of the second medical device component so the second medical device component hangs below the second receptacle, and the first receptacle is oriented laterally so as to be perpendicular, or nearly perpendicular, to the second receptacle and connects to a side portion of the first medical device component so the first medical device component hangs from the second arm portion.

Clause 26: The portable medical device system according to any one of Clauses 17-22, wherein the holder arm comprises a first arm portion configured to engage with the locking assembly, a second arm portion extending from the first arm portion configured to connect to one of the two medical device components, and a third arm portion extending from the first arm portion configured to connect to another of the two medical device components, wherein the holder arm is configured to maintain a relative position between the two medical device components suitable for placing the two medical device components in fluid communication with each other via one or more sections of tubing and/or for placing the two medical device components in electrical communication with each other and/or for placing the two medical device components in electrical communication with the medical device control console via one or more communications wires.

Clause 27: The portable medical device system according to any one of Clauses 17-22 and 26, wherein the holder arm has a multiplex configuration.

Clause 28: A holder system capable of mounting at least one medical device component to a control console support, comprising: a triplex holder arm configured to connect to and support at least one medical device component; a receiver configured to connect to the triplex holder arm, wherein the receiver is attached to the control console support to mount the triplex holder arm and the at least one medical device component on the control console support; and a locking assembly configured to releasably connect the triplex holder arm to the receiver, wherein a central longitudinal axis of the at least one medical component is positioned within a length of the control console support that extends from a front side of the control console support to a rear end of the control console support.

Clause 29: The holder system according to Clause 28, wherein the central longitudinal axis of the at least one medical component extends from a bottom surface of the at least one medical component to a top surface of the at least one medical component.

Clause 30: The holder system according to Clause 28 or Clause 29, wherein the at least one medical component comprises a first medical component and a second medical component, wherein the first medical component defines a first central longitudinal axis and the second medical component defines a second central longitudinal axis, wherein the first central longitudinal axis and the second central longitudinal axis are positioned within the length of the control console support.

Clause 31: The holder system according to Clause 30, wherein a distance between the first central longitudinal axis and the second central longitudinal axis ranges from 193 millimeters to 281 millimeters.

Clause 32: The holder system according to Clause 31, wherein the distance between the first central longitudinal axis and the second central longitudinal axis is 241 millimeters.

Clause 33: The holder system according to any of Clauses 30-32, wherein a distance between the first central longitudinal axis and an outer housing of the control console support ranges from 40 millimeters to 60 millimeters.

Clause 34: The holder system according to any of Clauses 30-33, wherein a distance between the second central longitudinal axis and the outer housing of the control console support ranges from 85 millimeters to 103 millimeters.

Clause 35: The holder system according to any of Clauses 30-34, wherein a distance between an outer housing of the first medical component and the outer housing of the control console support ranges from 1 millimeters to 10 millimeters.

Clause 36: The holder system according to any of Clauses 30-35, wherein a distance between an outer housing of the second medical component and the outer housing of the control console support ranges from 1 millimeters to 10 millimeters.

Clause 37: The holder system according to any of Clauses 28-36, wherein the holder system is operatively connected to a sprinter cart.

These and other features and characteristics of the present invention, as well as the methods of operation and functions of the related elements of structures and the combination of parts and economies of manufacture, will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular forms of "a", "an", and "the" include plural referents unless the context clearly dictates otherwise.

DETAILED DESCRIPTION OF THE DISCLOSURE

Figure 1:
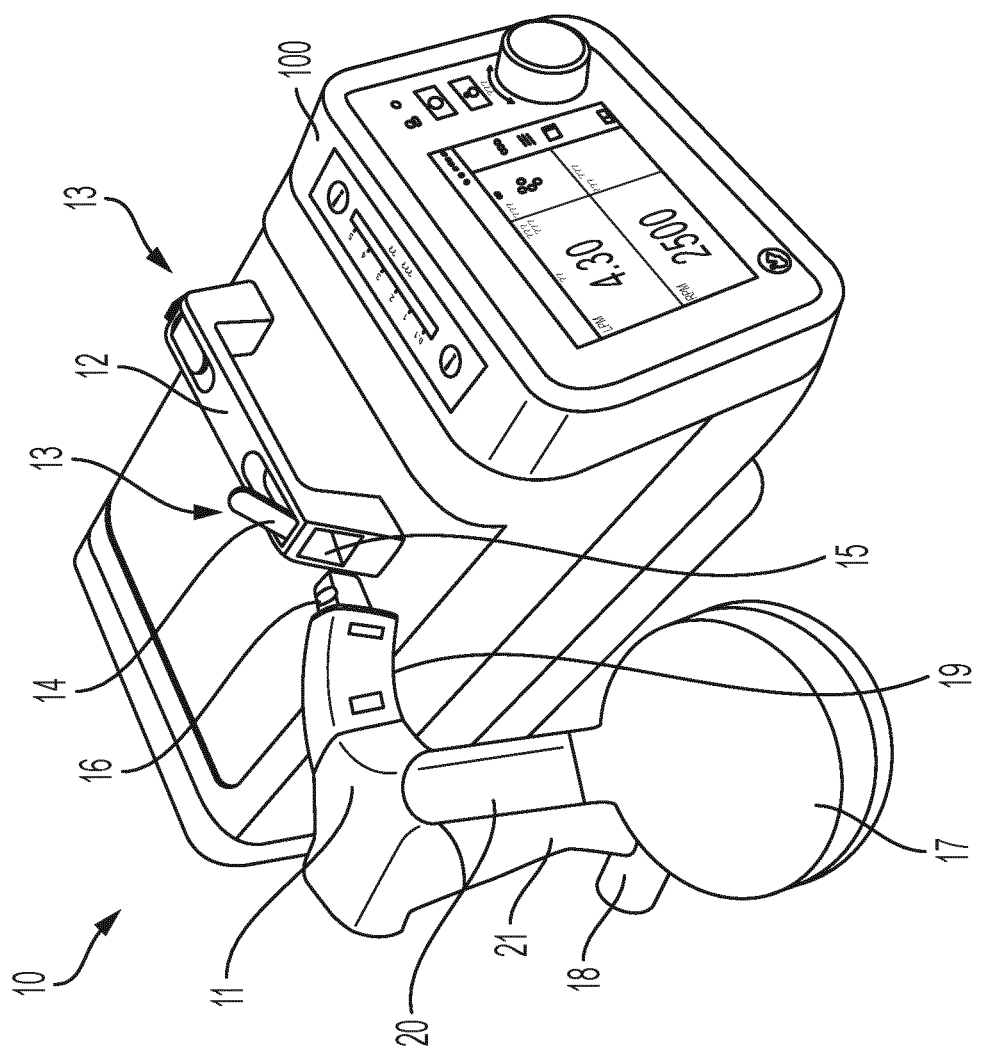
FIG. 1 is a perspective view of a holder system and control console support according to an example of the present disclosure.
Figure 2:
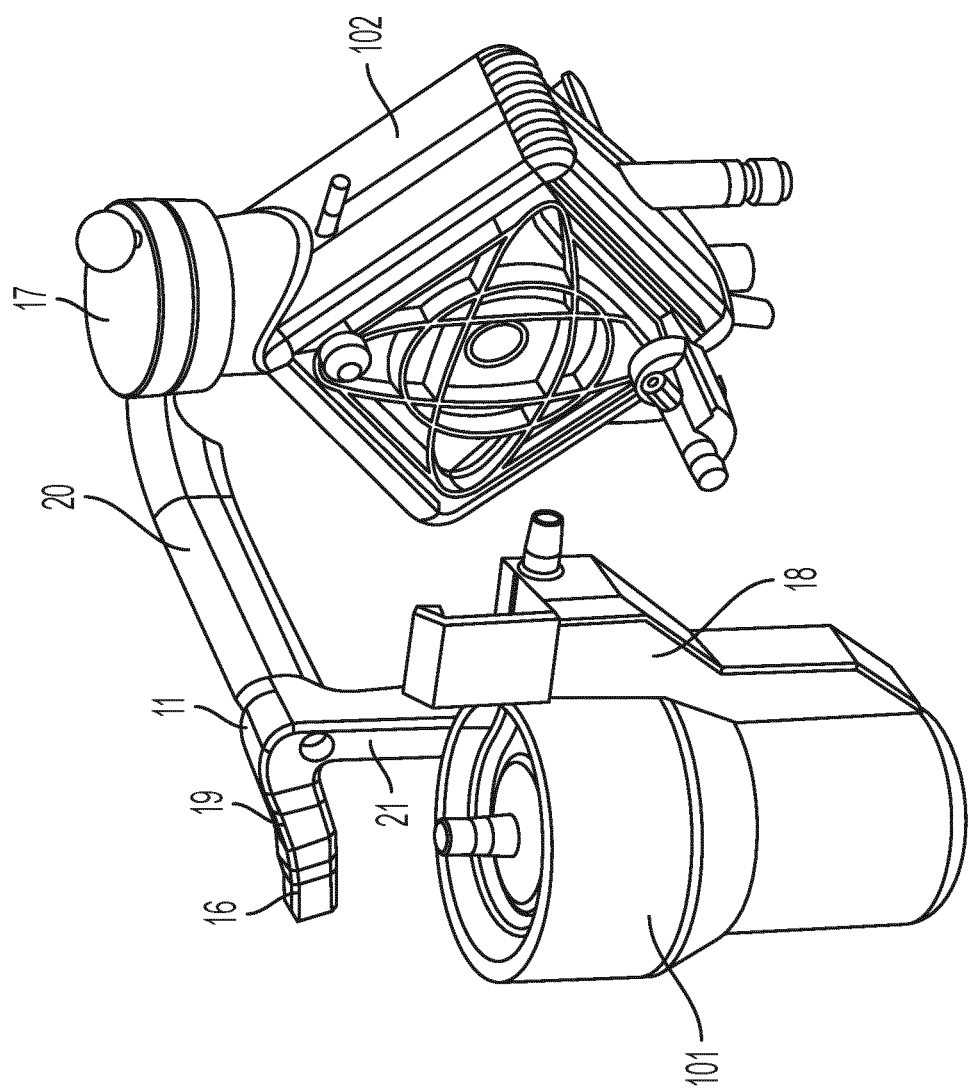
FIG. 2 is a perspective view of a holder arm of the holder system of FIG. 1 with the medical device components mounted thereon according to an example of the present disclosure.
Figure 3:
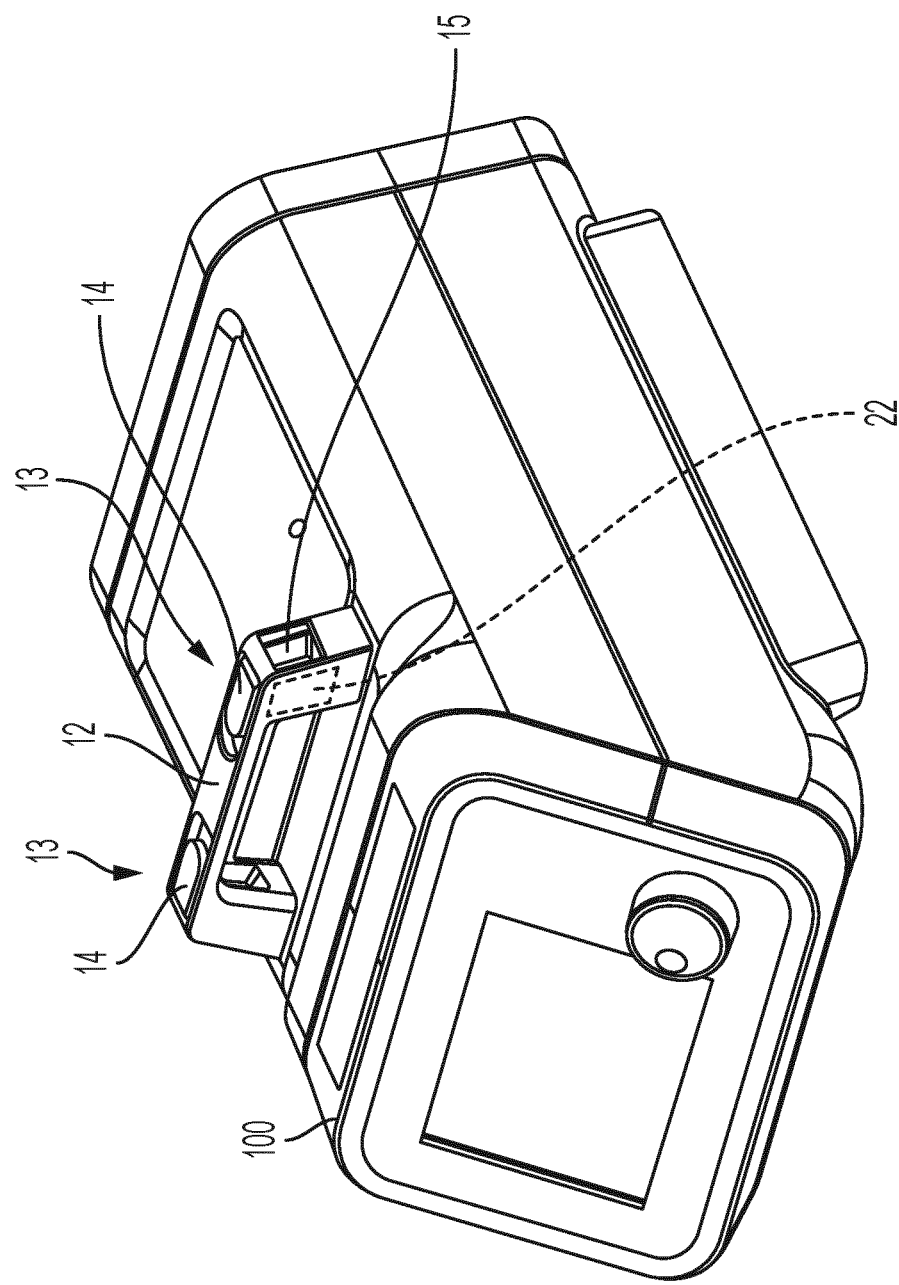
FIG. 3 is a perspective view of a handle receiver of the holder system and the control console support of FIG. 1.

For purposes of the description hereinafter, the terms "end", "upper", "lower", "right", "left", "vertical", "horizontal", "top", "bottom", "lateral", "longitudinal", and derivatives thereof shall relate to embodiments of the invention as oriented in the drawing figures. However, it is to be understood that the embodiments may assume various alternative variations and step sequences, except where expressly specified to the contrary. It is also to be understood that the specific devices and processes illustrated in the attached drawings and described in the following specification are simply exemplary embodiments or aspects of the invention. Hence, specific dimensions and other physical characteristics related to the embodiments or aspects disclosed herein are not to be considered as limiting.

With reference to FIGS. 1-4, a holder system 10 for mounting medical device components 101, 102 to a control console support 100 of a portable centrifugal blood pump system is described. An example of a centrifugal blood pump systems is the ROTAFLOW centrifugal pump and control console system (Maquet Cardiopulmonary GmbH, Rastatt Germany). According to an example, the support 100 includes a medical device control console for transmitting control communications and electrical energy to, and receiving sensor and data feedback from, one or more medical device components 101, 102, so as to provide a control console for a blood pump and permanent life support/oxygenation system capable as operating as a cardiopulmonary bypass machine or as an extracorporeal membrane oxygenation (ECMO) machine or as a pump assisted lung protected (PALP) machine useful for removing excess CO2 from a source of blood. According to the example, the medical device components 101, 102 mounted to the control console support 100 may include a medical pump 101, such as a centrifugal blood pump, and a permanent life support component 102, such as an oxygenator. It is to be appreciated that the holder system 10 according to this example may be used in connection with a wide variety of medical devices and may be used to mount any medical device component to a control console support found to be suitable to those having ordinary skill in the art. In certain embodiments such as a centrifugal blood pump, such blood pumps may utilize a magnetically levitated impeller to provide an adequate volumetric flow rates.

As shown in FIGS. 1-4, the holder system 10 includes a holder arm 11 configured to be connected to and support at least one medical device component, such as the medical pump 101 and/or the permanent life support component 102. The holder system 10 also includes a receiver 12 configured to be connected to the holder arm 11. The receiver 12 is configured to be attached to the support 100 to mount the holder arm 11 and the at least one medical device component 101, 102 to the support 100. According to an example, the receiver includes or is embodied as a handle or handgrip 12 disposed on the control console support 100 for manually lifting/carrying the control console support 100 via a user's hand, as well as the holder system 10 and the at least one medical device component 101, 102. In an embodiment, the receiver 12 is configured to releasably connect to the control console support 100 to mount the holder arm 11 and two medical device components 101, 102, such as a blood pump and an oxygenator respectively.

The holder system 10 further includes a locking assembly 13 configured to releasably connect the holder arm 11 to the receiver 12. According to an example, the locking assembly 13 includes a latching arm 14 disposed on the receiver 12. The locking assembly 13 includes a recess 15 formed in the receiver 12 and the latching arm 14 pivotably disposed on the receiver 12. The holder arm 11 includes a protrusion 16 at an end thereof that is configured to be inserted into the recess 15 of the locking assembly 13. The latching arm 14 is movable to engage and disengage an internal locking mechanism (not shown) with the protrusion 16 on the holder arm 11 when the protrusion 16 is received within the recess 15 to lock the holder arm 11 in a connection with the receiver 12 and release the holder arm 11 from the receiver 12 depending upon the position of the latching arm 14. Movement of the latching arm 14 from a first position to a second position may thereby reversibly transition the locking assembly from a locked state to an unlocked state. The locking mechanism employed is not limited and may be any one of a known set of locking mechanisms suitable for the intended purpose. The locking assembly 13 may comprise a latch 22, shown schematically in FIG. 3, and/or it may operate as a latch.

In particular, the latching arm 14 is disposed on the receiver 12 to pivot to a lowered position on the receiver 12 in order to engage the locking mechanism with the protrusion 16 on the holder arm 11 within the recess 15 to lock the protrusion 16 within the recess 15 and the holder arm 11 into engagement with the receiver 12, and the latching arm 14 is disposed to pivot to a raised position on the receiver 12 to disengage the protrusion 16 from the locking mechanism and thereby release the holder arm 11 from the receiver 12. In an embodiment, the latching arm 14 may be biased to a lowered position to automatically lock the protrusion 16 within the recess 15 when the protrusion 16 is inserted in the recess 15. According to the example, the locking assembly 13 is configured to be used in an intuitive manner and as a self-locking mechanism. The locking assembly 13 may be configured to provide a click when the protrusion 16 is locked within the recess 15 to provide medical personnel with visual, audible, and tactile confirmation that the holder arm 11 is properly secured to the receiver 12 and the control console support 100.

As shown in FIGS. 1-4, the holder arm 11 includes at least one receptacle 17, 18 that connects the at least one medical device component 101, 102 to the holder arm 11. According to an example, the at least one medical device component includes two medical device components 101, 102, and the at least one receptacle includes two receptacles 17, 18. The holder arm 11 is shown in certain embodiments to have a triplex configuration that includes a first arm portion 19 with the protrusion 16 defined or otherwise located at an end thereof and configured to be engaged by the locking assembly 13, a second arm portion 20 extending from the first arm portion 19 configured to be connected to one of the two medical device components 101, 102, and a third arm portion 21 extending from the first arm portion 19 configured to be connected to another of the two medical device components 101, 102. In this context, a triplex configuration means that the holder arm 11 has only three arm portions. In accordance with this disclosure, the first arm portion 19 may be straight or curved, the second arm portion 20 may be straight, or have a distal laterally curved portion, or it may have a two straight portions connected together by an upwards angled portion, and the third arm portion 21 may have a proximal portion that is either straight or curved downwards and a distal portion that has either a 90 degree curve or that has a twisted J-shape.

A receptacle 17 is disposed at an end of the second arm portion 20 for connecting a medical device component 102, such as a permanent life support component/oxygenator, to the holder arm 11. A receptacle 18 is disposed at an end of the third arm portion 21 for connecting another medical device component 101, such as a pump drive and/or centrifugal blood pump, to the holder arm 11. In accordance with a non-limiting embodiment of this disclosure, the receptacle 17 is disposed at the end of the second arm portion 20 so as to be oriented downwards so as to connect with an upper portion of the oxygenator 102 so that the oxygenator hangs below the receptacle 17, and/or the receptacle 18 is disposed at the end of the third arm portion 21 so as to be oriented in a lateral direction that is perpendicular, or nearly perpendicular, to the downwards orientation of the receptacle 17 so that the receptacle 18 connects with a side portion of the pump drive and/or centrifugal blood pump 101 so the pump drive and/or centrifugal blood pump 101 hangs from the third arm portion 21.

Figure 9:
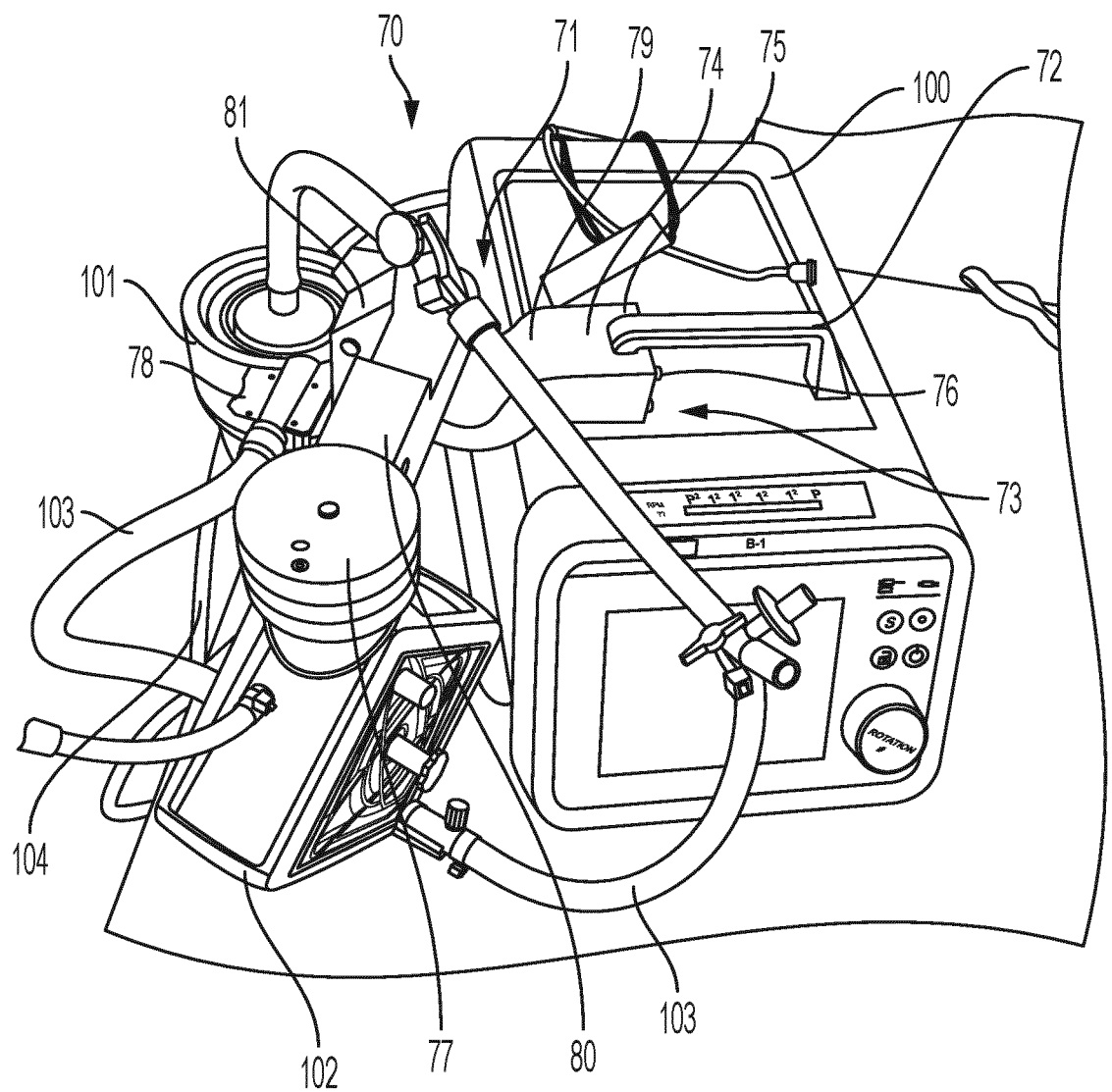
FIG. 9 is a perspective view of a holder system, control console support, and medical device components according to an example of the present disclosure.
Figure 10:
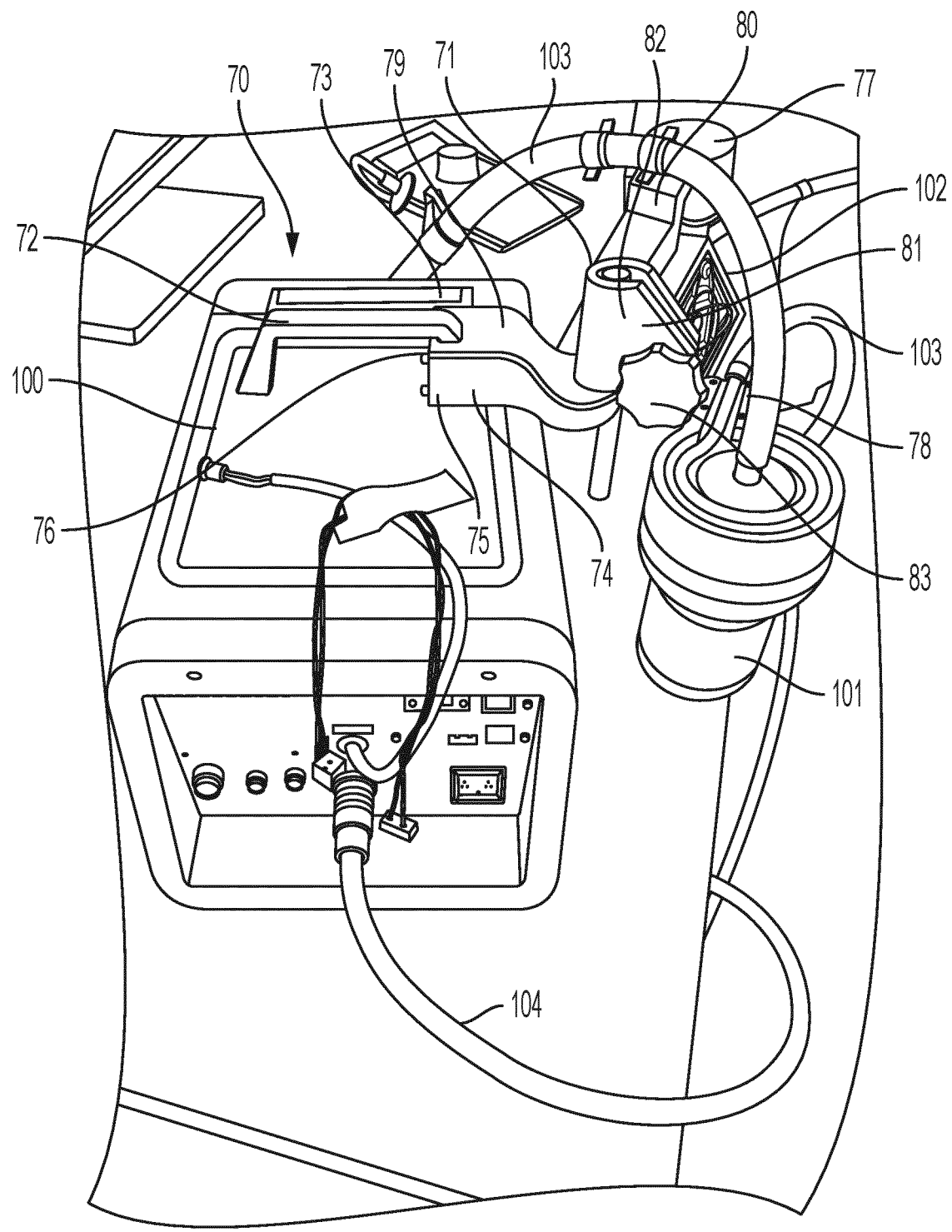
FIG. 10 is another perspective view of the holder system, control console support, and medical device components of FIG. 9.

The holder arm 11 is configured to maintain a relative position between the two medical device components 101, 102 suitable for placing the two medical device components 101, 102 in fluid communication with each other via one or more sections of tubing 103 (shown in FIGS. 9 and 10) and/or for placing the two medical device components 101, 102 in electrical communication with each other and/or for placing the two medical device components 101, 102 in electrical communication with a control console 100 via one or more communications wires and/or energy delivery wires 104 (shown in FIGS. 9 and 10). According to an embodiment, the holder arm 11 is configured such that the first arm portion 19, second arm portion 20, and third arm portion 21 are sized and configured to hold the medical device components 101, 102 at an appropriate distance and spatial relationship with respect to each other so that the control console support 100, holder system 10 and medical device components 101, 102 are suitably portable together as a unit for practical transport in hospital ward hallways, in hospital elevators, and in similarly constrained spaces. According to an example of the present disclosure, the arm portions 19, 20, 21 may be connected by movable joints and/or may have extensible lengths so that the relative positions of the medical device components 101, 102 and the support/control console 100 may be adjusted. According to another example of the present disclosure, the holder arm 11 may incorporate a system, such as channels and/or clips, for connecting for the tubing sections 103 and/or the communications wires 104 to the holder arm 11 and for routing the tubing sections 103 and/or the communications wires 104 between the medical device components 101, 102 and/or between the medical device components 101, 102 and the control console 100. According to another example of the present disclosure, the holder arm 11 may be divided into multiple holder arms connected to the support/console at different points thereon.

It is to be appreciated that the holder arm 11 may be configured to hold any number of medical device components of any type found to be suitable to those having ordinary skill in the art. In such a case, the receptacles 17, 18 may be configured to receive more than one medical device component at a time in accordance with an embodiment of this disclosure. It is to be further appreciated that the receptacles 17, 18 are structured and configured in a manner suitable for attaching the medical device components 101, 102 to the holder arm 11. In accordance with another embodiment of this disclosure, the holder arm 11 has a multiplex configuration, which means that it may have more than three arm portions, with each additional arm portion configured to hold one or more medical device components. However, there is a practical limit to the number of arm portions because, at some point, additional arm portions will compromise the portability of the control console support 100, holder system 10, and supported medical component devices as a unit.

According to the example of FIGS. 1-4, the holder system 10 addresses the above-discussed problems with respect to transporting life support equipment with a patient while the patient is being moved within a facility and offers medical personnel the possibility to arrange the control console support 100 and medical device components 101, 102 as needed for transport. The holder system 10 provides a compact holder for the medical device components 101, 102. The holder system 10 also provides for handling of the control console support 100, medical device components 101, 102, and the associated tubing sections 103 and communications wires 104 as a single unit, which facilitates easy and safe handling by a single person. Priming and repositioning of the medical device components 101, 102 relative to the tubing sections 103 and communications wires 104 can also be carried out by a single person, making the process more convenient and safer.

The holder arm 11 may also be configured to provide for optimal routing of the tubing sections 103 and the communications wires 104 between the medical device components 101, 102 and between the medical device components 101, 102 and the control console 100. The holder arm 11 may be ergonomically designed so that it can be handled more comfortably and safely. Due to the relative positioning of the medical device components 101, 102, the holder arm 11 also offers an advantageous option for management of the communications wires 104 to sensors that belong to the individual medical device components 101, 102.

As mentioned above, the locking assembly 13 on the receiver/handle 12 is configured to provide a snap or click when the holder arm 11 is locked to the handle 12, which contributes to safety by providing visual, audible, and tactile feedback on the correct locking position (lifting and lowering the latching arm 14). Additionally, as shown in FIGS. 1-4, locking assemblies 13 may be provided on opposite sides of the handle 12, thereby allowing for the holder arm 11 to be connected on either side of the control console 100, which provides additional flexibility for positioning the holder arm 11 on the control console 100.

Figure 4:
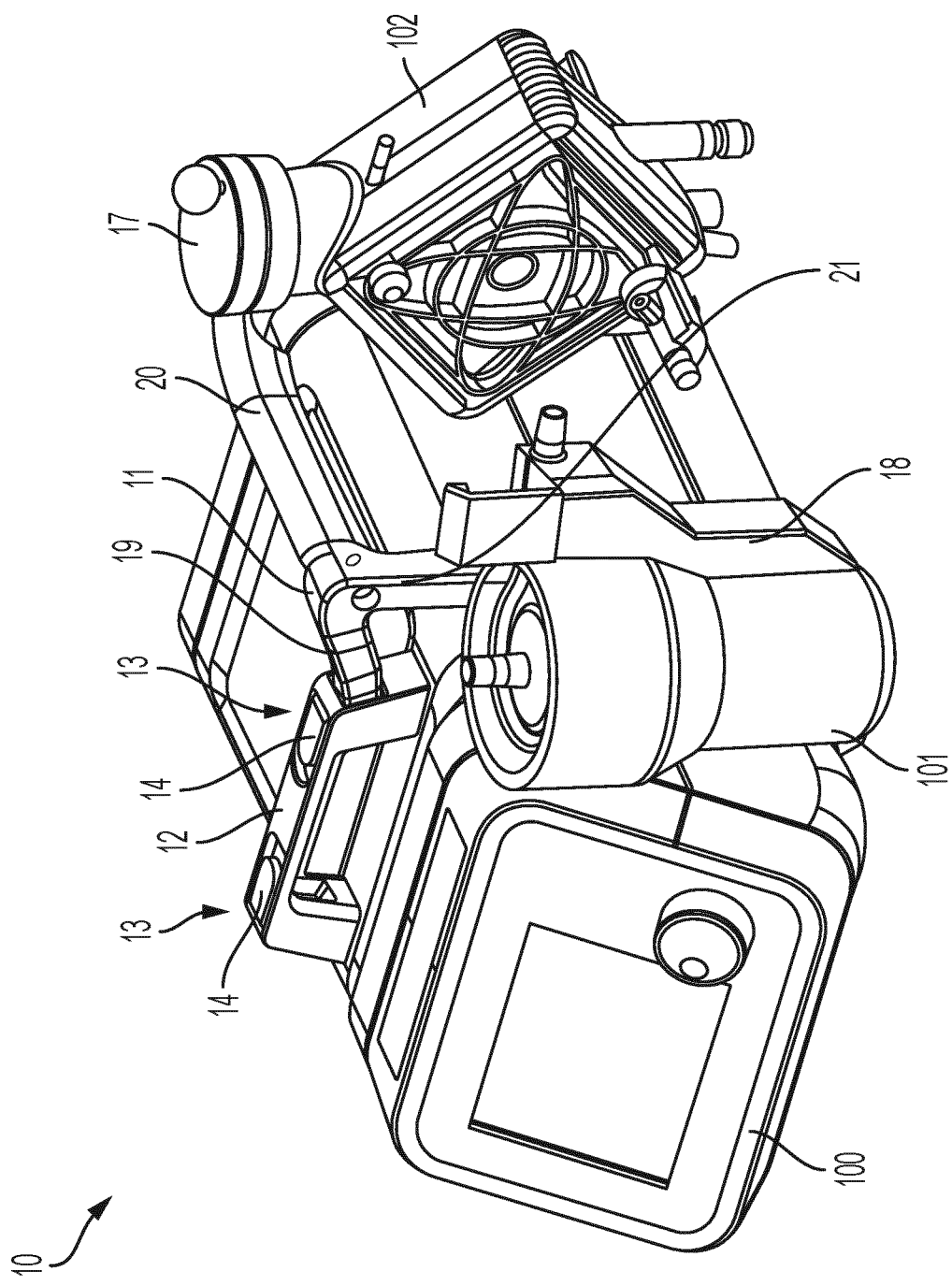
FIG. 4 is another perspective view of the holder system and control console support of FIG. 1 with the medical device components mounted thereon.
Figure 4A:
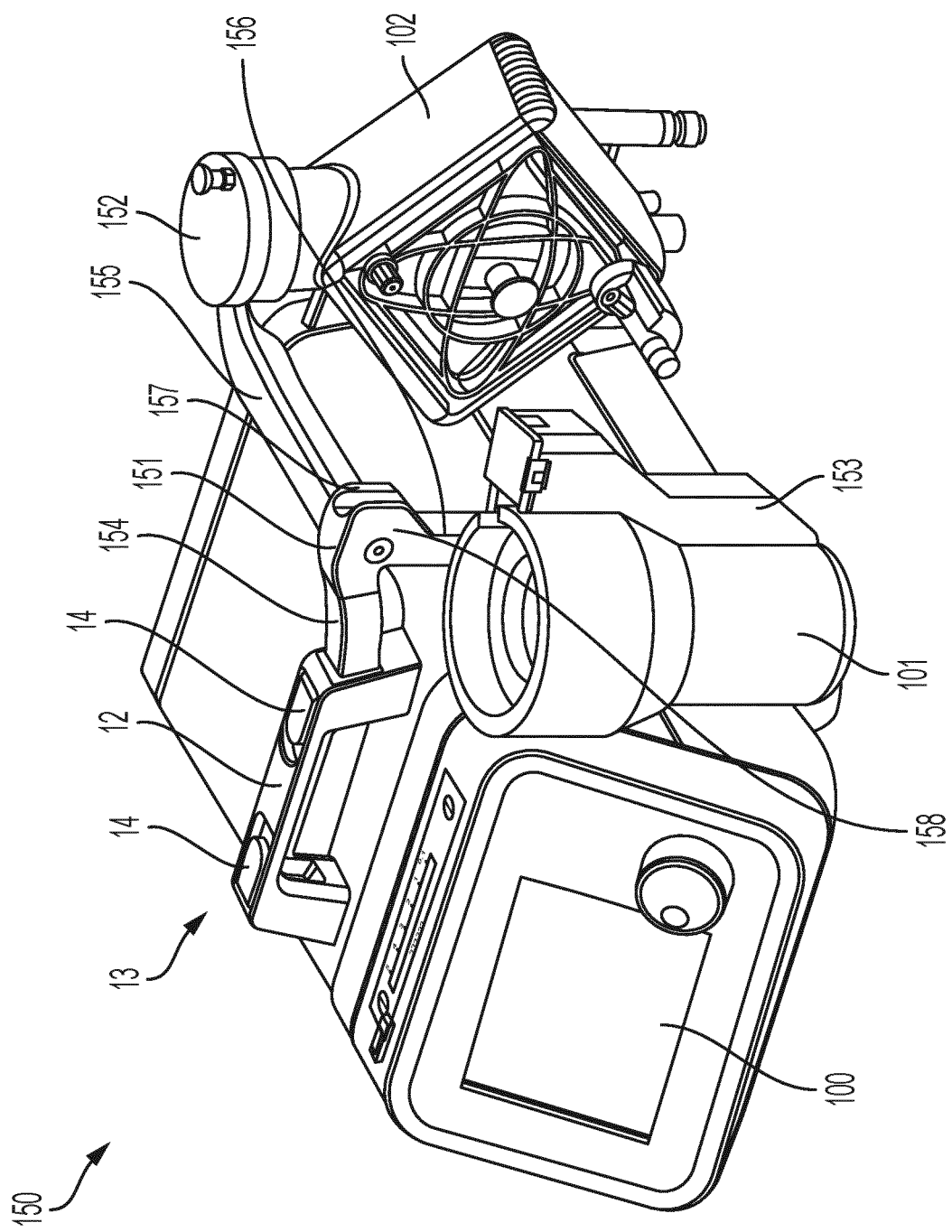
FIG. 4A is a perspective view of a holder system and control console support with the medical device components mounted thereon according to an example of the present disclosure.

With reference to FIG. 4A, a holder system 150 for mounting medical device components 101, 102 to a control console support 100 of a portable centrifugal blood pump system is described in accordance with another non-limiting embodiment of the disclosure. The medical device components 101, 102 and the control console support 100 shown in FIG. 4A are the same as described above with reference to FIGS. 1-4. The holder system includes a holder arm 151 or compact holder configured to be connected to and support at least one medical device component, such as the medical pump 101 and/or the permanent life support component 102 in the same manner as the holder arm 11 described with reference to FIGS. 1-4. The holder system 150 also includes the receiver 12, described above with reference to FIGS. 1-4, configured to be connected to the holder arm 151. The holder system 150 further includes a locking assembly 13 configured to releasably connect the holder arm 11 to the receiver 12, as described above with reference to FIGS. 1-4.

As shown, the holder arm 151 includes at least one receptacle 152, 153 that connects the at least one medical device component 101, 102 to the holder arm 151. According to an example, the at least one medical device component includes two medical device components 101, 102, and the at least one receptacle includes two receptacles 152, 153. The receptacles 152, 153 may be the same as the receptacles 17, 18 described above with reference to FIGS. 1-4. The holder arm 151 has a triplex configuration that includes a first arm portion 154, which may include a protrusion, such as the protrusion 16 described above with reference to FIGS. 1-4, defined at an end thereof and configured to be engaged by the locking assembly 13, a second arm portion 155 extending from the first arm portion 154 configured to be connected to one of the two medical device components 101, 102, and a third arm portion 156 extending from the first arm portion 154 configured to be connected to another of the two medical device components 101, 102. In this context, a triplex configuration means that the holder arm 151 has only three arm portions. In accordance with this disclosure, the first arm portion 154 may be curved or straight, the second arm portion 155 may be straight, or have a distal laterally curved portion, or it may have a two straight portions connected together by an upwards angled portion, and the third arm portion 156 may have a proximal portion that is either straight or curved downwards and a distal portion that has either a 90 degree curve or that has a twisted J-shape.

Figure 6:
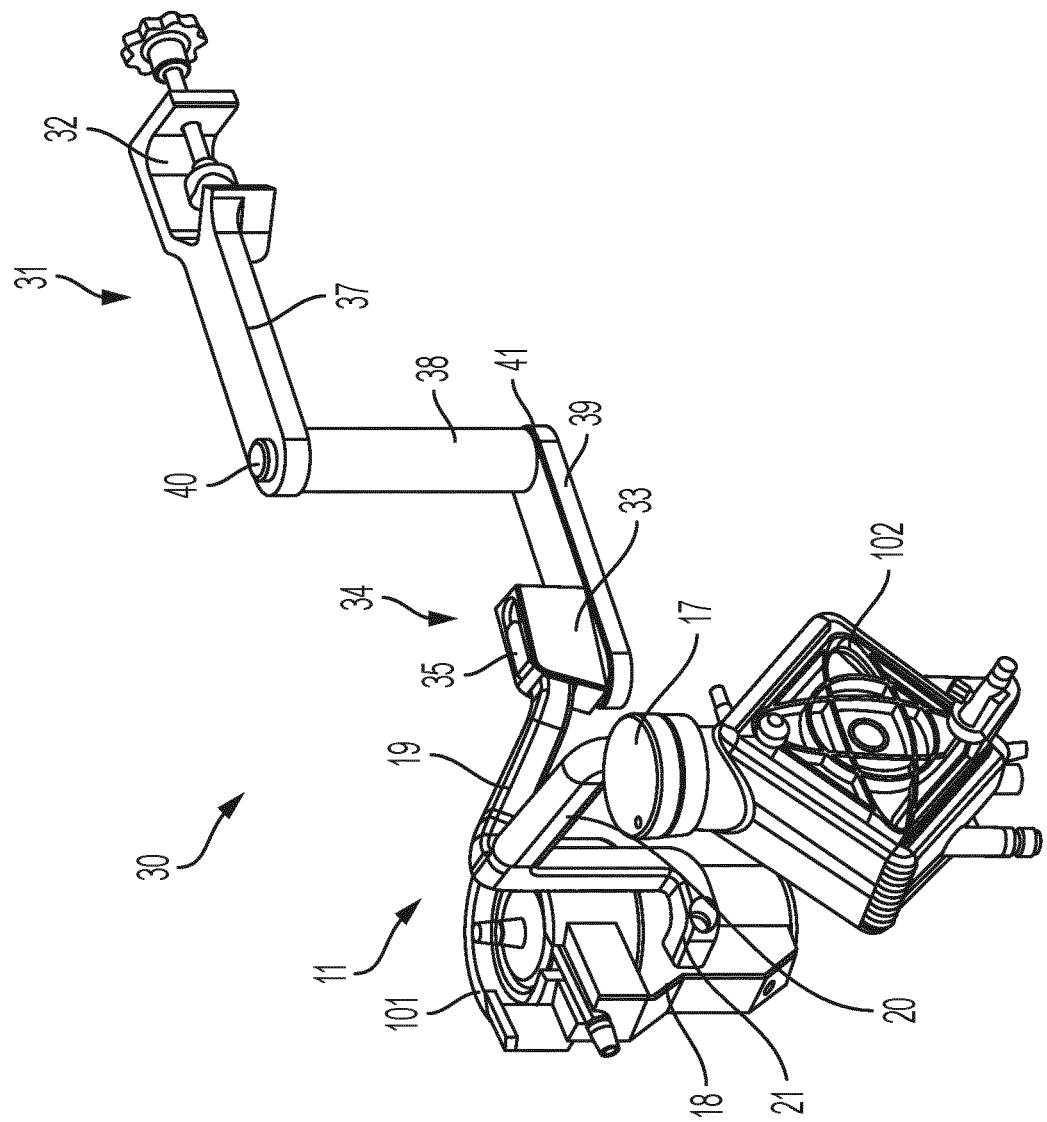
FIG. 6 is a perspective view of a holder system according to an example of the present disclosure including the receiver arm assembly of FIG. 5.
Figure 6A:
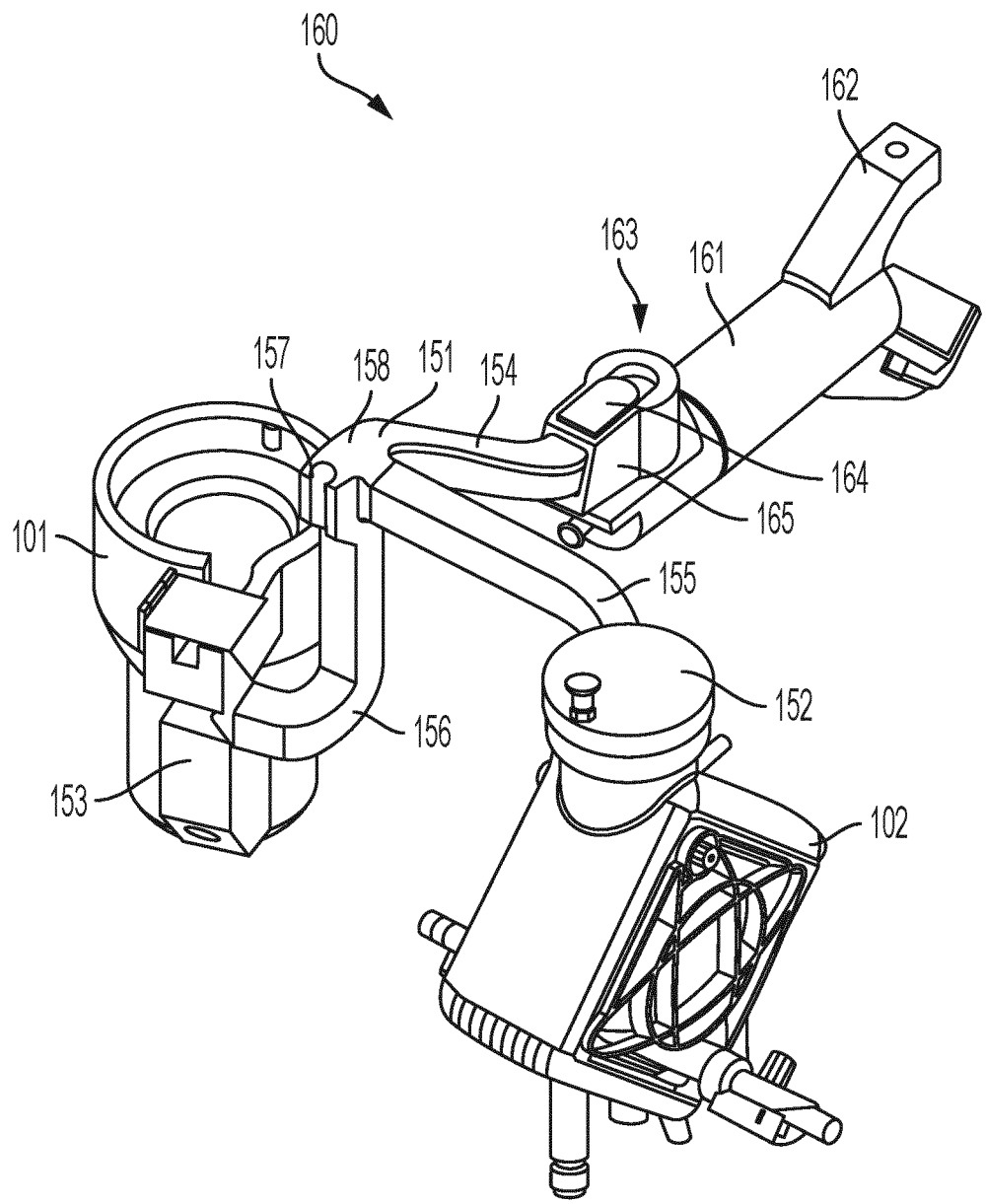
FIG. 6A is a perspective view of a holder system according to an example of the present disclosure including a receiver arm assembly.

With reference to FIGS. 4A and 6A, according to a particular example of the disclosure, the first arm portion 154, second arm portion 155, and third arm portion 156 meet at their respective ends to define a juncture 158. The first arm portion 154 is curved downward and horizontally from the juncture 158, the second arm portion 155 is extends horizontally straight from the juncture 158 and has a distal laterally curved portion, and the third arm portion 156 extends downwardly from the juncture 158 and has a twisted J-shape. Also, according to the disclosure, the holder arm 151 includes a tube guide 157 defined thereon for connecting the tubing sections 103 and/or the communications wires 104 to the holder arm 11 and for routing the tubing sections 103 and/or the communications wires 104 between the medical device components 101, 102 and/or between the medical device components 101, 102 and the control console 100 and for preventing or limiting kinking within the tubing sections 103. According to a particular example, the tube guiding 157 includes a channel defined by two outward protrusions defined on the third arm portion 156 of the holder arm 151 near the junction 158 of the arm portions 154, 155, 156 that receives one or more tubing sections 103 and/or one or more communications wires 104 therein. It is to be appreciated that the holder arm 151 may include additional tube guides 157 at multiple locations on the holder arm 151 and that the tube guide 157 may be of any configuration suitable for holding tubing sections 103 and/or communications wires 104. In accordance with this disclosure, the holder arm 151 may be configured such that the communication wires 104 and/or tubing sections 103 are routed through the interior of the holder arm 151 rather than externally. The holder arm 151 may further include a sensor hub attached to the outside.

Figure 11:
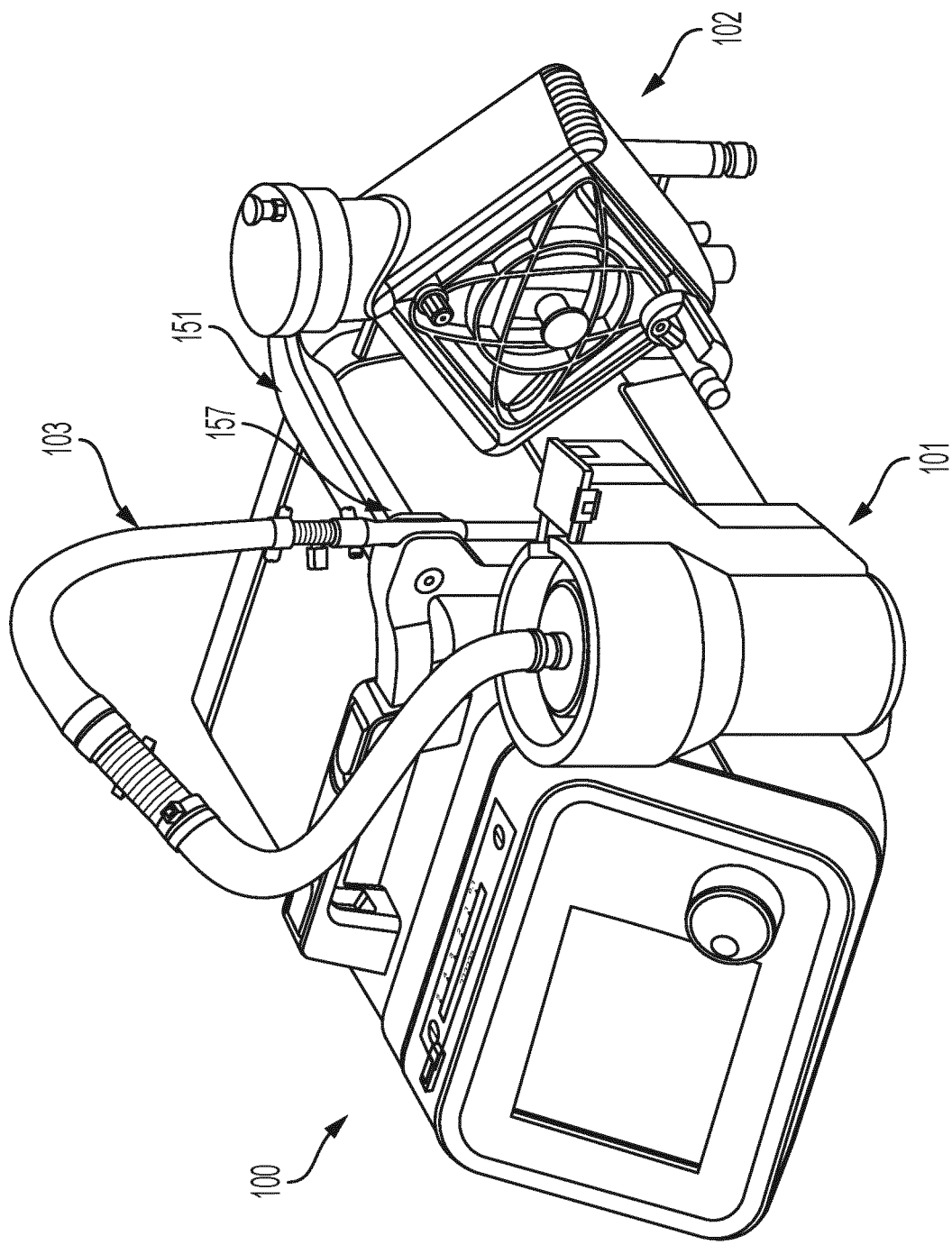
FIG. 11 is a perspective view of the holder system and control console support with the medical device components mounted thereon of FIG. 4A in which a tubing member is held on the holder system.

As shown in FIG. 11, according to one non-limiting embodiment of the present disclosure, the tube guiding 157 of the holder arm 151 of the holder system 150 may receive the one or more tubing sections 103.

Figure 12:
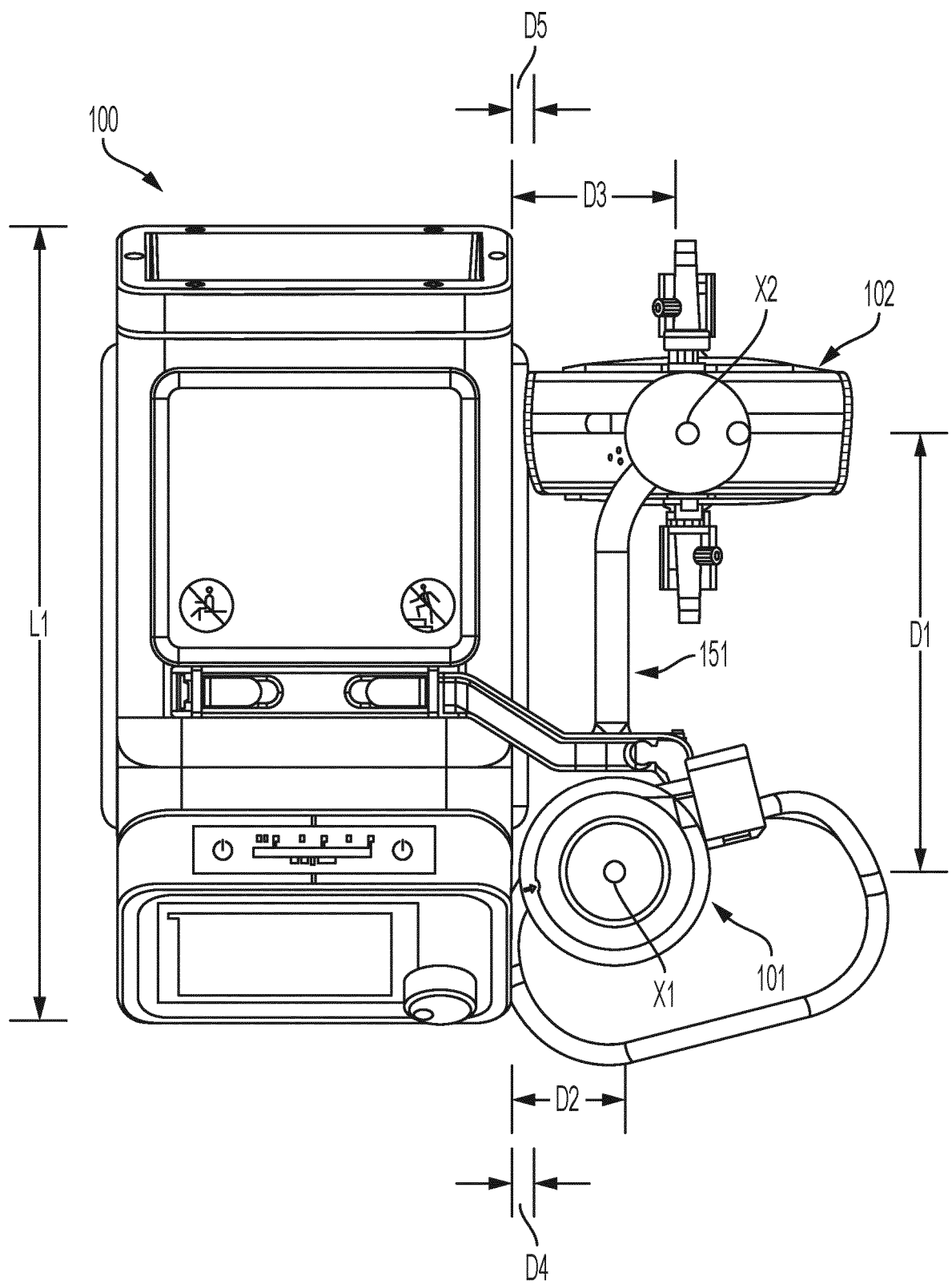
FIG. 12 is a top view of the holder system of FIG. 4A.

With reference to FIG. 12, according to one non-limiting embodiment of the present disclosure, the holder arm 151 of the holder system 150 may be configured to reduce the overall space "footprint" of the holder system 150. By reducing the overall space "footprint" of the holder system 150, that is, the amount of space, area or volume occupied by the holder system 150 and the medical components and tubing it supports, inadvertent contact of the holder system 150 and/or the medical components it supports, against a wall, a door, or any other obstacle that may placed in front of the holder system 150 may be substantially lessened or eliminated, thereby ensuring the holder system 150 is not damaged or destroyed. In other words, the configuration of control console support 100 and holder system 150 supporting medical device components 101, 102 provides a remarkably compact configuration for supporting a portion of an extracorporeal blood circuit, for example, such as may be used to treat a patient with extracorporeal membrane oxygenation (ECMO) or pump-assisted lung protection (PALP) therapies (also known as or extracorporeal CO2 removal (ECCO2R) therapies).

In one non-limiting example of the present disclosure, both of the medical device components 101, 102 may be positioned within the length L1 of the control console support 100. By ensuring the medical device components 101, 102 are positioned within the length L1 of the control console support 100, the chances that the medical device components 101, 102 contact undesired obstacles is significantly reduced. In another non-limiting example of the present disclosure, the medical device components 101, 102 may be positioned between a front end of the control console support 100 and a rear end of the control console support 100.

In one non-limiting example of the present disclosure, each of the medical device components 101, 102 may each define a central longitudinal axis X1 and X2, respectively. The central longitudinal axes X1 and X2 may extend from the top of each medical device component 101, 102 to the bottom of each medical device component 101, 102. In one non-limiting example of the present disclosure, a distance D1 between the central longitudinal axes X1 and X2 of the medical device components 101, 102 may range from 193 millimeters to 289 millimeters. In one example, the distance D1 between the central longitudinal axes X1 and X2 of the medical device components 101, 102 may be 241 millimeters or thereabout.

With continued reference to FIG. 12, according to one non-limiting example of the present disclosure, a distance D2 between the central longitudinal axis X1 of the medical device component 101 and the outer housing of the control console support 100 may be between 40 millimeters and 60 millimeters. In one example, the distance D2 between the central axis of the medical device component 101 and the outer housing of the control console support 100 may be 56 millimeters or thereabout. According to one non-limiting example of the present disclosure, a distance D3 between the central longitudinal axis X2 of the medical device component 102 and the outer housing of the control console support 100 may be between 85 millimeters and 103 millimeters. In one non-limiting example of the present disclosure, the distance D3 between the central longitudinal axis X2 of the medical device component 102 and the outer housing of the control console support 100 may be 94 millimeters or thereabout.

With continued reference to FIG. 12, according to one non-limiting example of the present disclosure, a distance D4 between the outer housing of the medical device component 101 and the outer housing of the control console support 100 may be between 1 millimeters and 10 millimeters. In one non-limiting example of the present disclosure, a distance D5 between the outer housing of the medical device component 102 and the outer housing of the control console support 100 may be between 1 millimeters and 10 millimeters. In one non-limiting example of the present disclosure, the medical device component 101 may be a pump for blood or other liquid and the medical device component 102 may be a diamond-shaped oxygenator. In one non-limiting example of the present disclosure, the medical device component 101 is a blood pump and the medical device component 102 is a diamond-shaped oxygenator, which are connected to one another by tubing through which blood flows so that the console support 100, the medical device component 101 and the medical device component 102 form a compact portion of an extracorporeal blood circuit providing extracorporeal membrane oxygenation (ECMO) to a patient with a minimal space footprint. In one non-limiting example of the present disclosure, the medical device component 101 is a blood pump and the medical device component 102 is CO2 removal device, which are connected to one another by tubing through which blood flows so that the console support 100, the medical device component 101 and the medical device component 102 form a compact portion of an extracorporeal blood circuit providing pump-assisted lung protection (PALP) (also known as or extracorporeal CO2 removal (ECCO2R) therapy) to a patient with a minimal space footprint.

Figure 5:
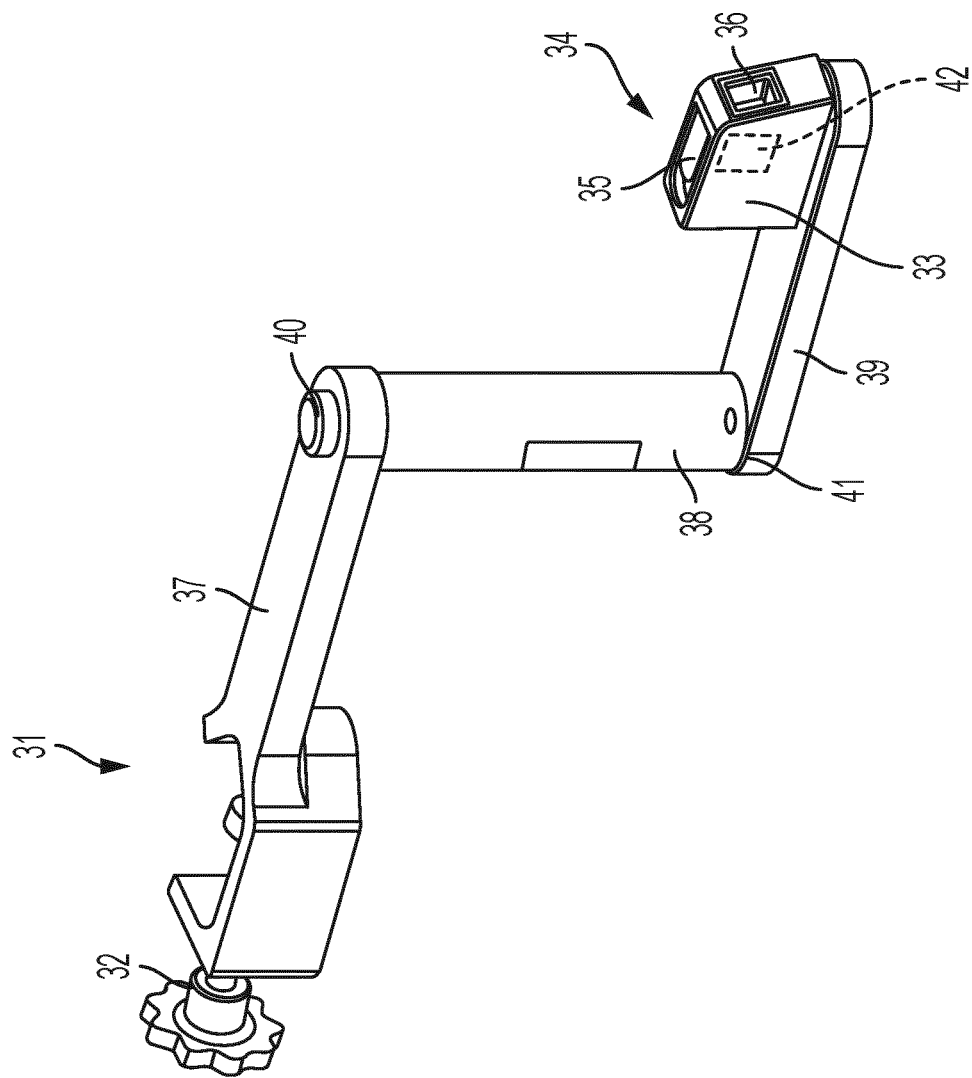
FIG. 5 is a perspective view of a receiver arm assembly for a holder arm system according to an example of the present disclosure.

With reference to FIGS. 5 and 6, a holder system 30, in accordance with another non-limiting embodiment of this disclosure, includes a receiver arm assembly 31 as shown. The receiver arm assembly 31 includes a clamp assembly 32, such as a screw clamp, on end of the receiver arm assembly 31 that releasably connects the receiver arm assembly 31 to a support, such as a cart (not shown). The receiver arm assembly also includes at least one joint 40, 41 movably connecting the ends of the receiver arm assembly 31. The receiver arm assembly 31 further includes a latch housing 33 incorporating a locking assembly 34 disposed on an opposite end of the receiver arm assembly 31. According to an example, the locking assembly includes a locking assembly 34, such as may comprise a latch 42, shown schematically in FIG. 5, and/or operate as a latch, disposed on the latch housing 33. The locking assembly 34 on the latch housing 33 may have the same or a similar configuration to the locking assembly 13 described above with reference to FIGS. 1-4 and, as shown in FIGS. 5 and 6, is configured to releasably connect the holder arm 11 described above with reference to FIGS. 1-4 to the receiver arm assembly 31. Accordingly, the locking assembly 34 includes a recess 36 formed in the latch housing 33 and a latching arm 35 pivotably connected to the latch housing 33. The holder arm 11 includes the protrusion 16 at an end thereof configured to be inserted into the recess 36 in the latch housing 33. The latching arm 35 is movable in order to engage and disengage the locking assembly 34 with the protrusion 16 on the holder arm 11 when the protrusion 16 is received within the recess 36 to lock the holder arm 11 in connection with the receiver arm assembly 31 and to release the holder arm 11 from the receiver arm assembly 31, depending upon the position of the latching arm 35. In an embodiment, when the latching arm 35 is in an up position (i.e., extending above the surface of the latch housing 33), the locking assembly 34 is disengaged from the protrusion 16 of the holder arm 11 and when the latching arm 35 is in a down position (i.e., flush with the surface of the latch housing 33) the locking assembly 34 engages the protrusion 16 of the holder arm 11 when protrusion 16 is located in the recess 36 of the latch housing 33.

As shown in FIGS. 5 and 6, the receiver arm assembly 31 includes a proximal arm component 37 incorporating the clamp assembly 32, a distal arm component 39 that supports the latch housing 33 thereon, and a middle arm component 38 connecting the proximal arm component 37 to the distal arm component 39. The proximal arm component 37 is connected to the middle arm component 38 by a first joint 40, and the middle arm component 38 is connected to the distal arm component 39 by a second joint 41. The proximal and distal arm components 37, 39 are oriented parallel to each other with the middle arm component 38 extending perpendicular between the proximal and distal arm components 37, 39. The joints 40, 41 pivotably connect the proximal arm component 37 and the distal arm component 39 to opposite ends of the middle arm component 38. The latch housing 33 is disposed on an end of the distal arm component 39 and may be pivotably connected to the distal arm component 39 so as to be able to swivel on the distal arm component 39. Accordingly, the position and angle of the holder arm 11 and the medical device components 101, 102 with respect to the support may be adjusted by pivoting the arm components 37, 38, 39 and the latch housing 33 of the receiver arm assembly 31 with respect to each other. It is to be appreciated that the receiver arm assembly 31 may be configured in any manner found to be suitable to those having ordinary skill in the art. In particular, the relative angular orientation of the arm components 37, 38, 39 may be adjustable, or the arm components 37, 38, 39 may incorporate internal joints or extensible lengths. Thus, it should be appreciated that each of joints 40, 41 provides an independent pivot axis for rotatable movement between the proximal arm component 37 and the middle arm component 38 and between the middle arm component 38 and the distal arm component 39, respectively.

According to the example of FIGS. 5 and 6, the receiver arm assembly 31 can be fixed on a cart, or any other movable support found to be suitable to those having ordinary skill in the art to provide for transportation of the life support components with the patient, particularly those movable supports providing mounting points in the form of a pipe or a rail suitable for attachment. The multiple movable joints 40, 41 within the receiver arm assembly 31 allows medical personnel to cover all use and transport cases of the medical device components 101, 102 in an efficient manner. With several joints 40, 41 and length adjustment, the receiver arm assembly 31 offers the option of arranging the holder arm 11 with maximum flexibility while still meeting safety-related requirements such as observance of the correct alignment of the medical device components 101, 102. Thanks to simple adaptation options on the receiver arm assembly 11, safe and quick repositioning or relocation of the holder arm 11 to another connection point is also possible in the event that the receiver arm assembly 31 must be positioned in or moved through a confined space, such as a door, an elevator, etc.

With reference to FIG. 6A, a holder system 160, in accordance with another non-limiting embodiment of this disclosure, includes a receiver arm assembly/fixation point 161 as shown. The receiver arm assembly 161 includes a straight tubular or cylindrical arm extending between two ends. The receiver arm assembly 161 also includes a clamp assembly 162 at a first or proximal end thereof, which may be the same or similar to the clamp assembly 32 discussed above with reference to FIGS. 5 and 6, that releasably connects the receiver arm assembly 161 to a support, such as a cart (not shown). The receiver arm assembly 161 further includes a latch housing 165 incorporating a locking assembly 163 disposed on a distal or opposite end of the receiver arm assembly 161. According to an example, the latch housing 165 and the locking assembly 163 are substantially the same or similar to the latch housing 33 and locking assembly 34 described above with reference to FIGS. 5 and 6, and may include a latch (not shown) and/or operate as a latch disposed on the latch housing 165. The locking assembly 163 may operate to secure the holder arm 151 to the receiver arm assembly 161 in the same manner as the locking assembly 34 described above with reference to FIGS. 5 and 6 and include a latching arm 164 pivotably connected to the latch housing 165 to engage and disengage the locking assembly 163 with a protrusion (not shown) on the end of the first arm portion 154 of the holder arm 151. In accordance with the disclosure, the latch housing 165 may be pivotably connected at the end of the receiver arm assembly 161 so as to be able to swivel on the receiver arm assembly 161.

According to the example of FIG. 6A, the receiver arm assembly 161 can be fixed on a cart, or any other movable support found to be suitable to those having ordinary skill in the art to provide for transportation of the life support components with the patient, particularly those movable supports providing mounting points in the form of a pipe or a rail suitable for attachment. The receiver arm assembly 161 has a compact size and structure such that the receiver arm assembly 161 and the holder arm 151 do not extend significantly outward from the movable support, thus preventing or limiting the need to adjust the positioning of the receiver arm assembly 161 and the holder arm 151 on the movable support to maneuver through confined spaces during transport. Additionally, the clamp assembly 162 can be rotated relative to the latch housing 165, such that the receiver arm assembly 161 can be fixed on both vertical and horizontal tubes, rails, etc.

Figure 7:
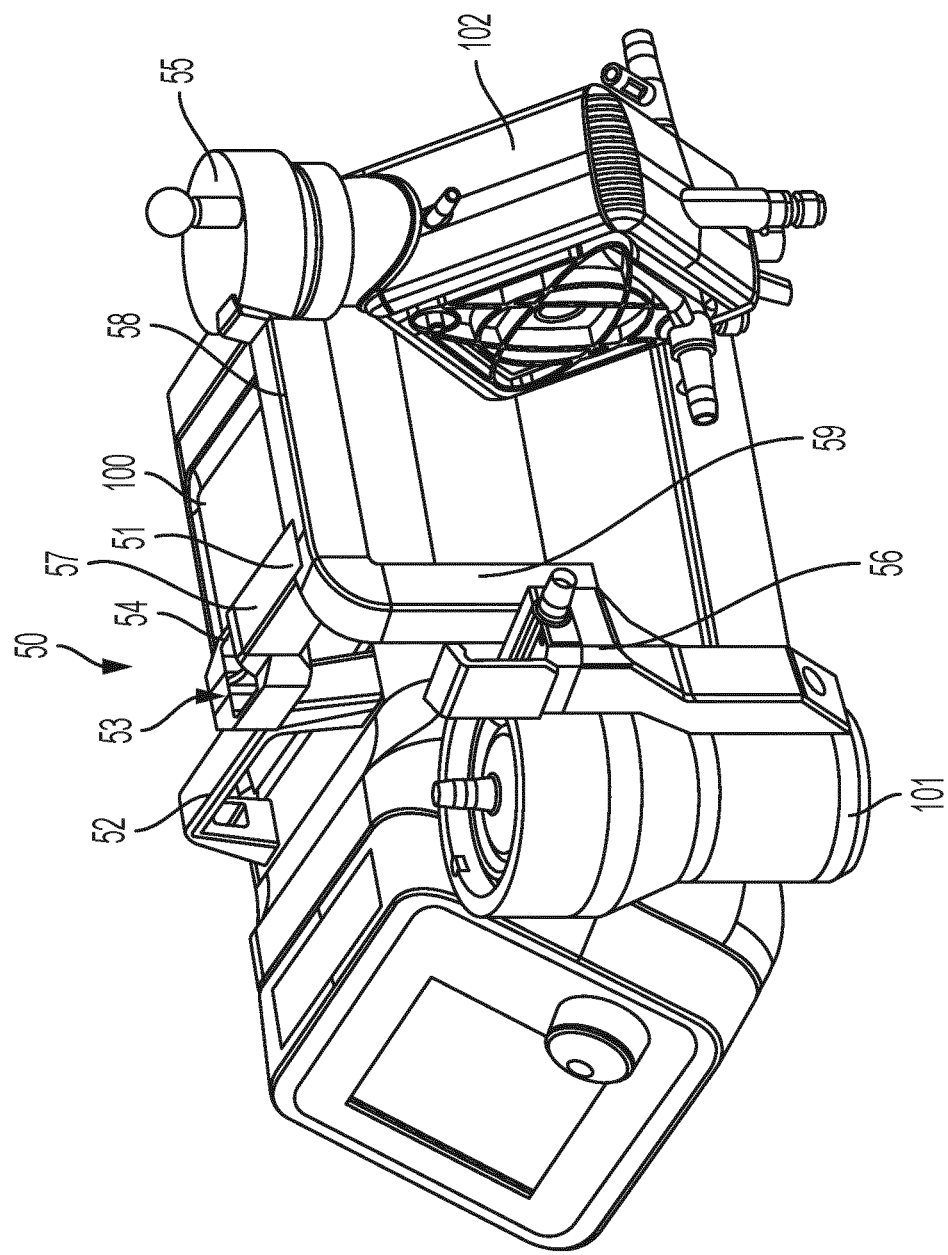
FIG. 7 is a perspective view of a holder system, control console support, and medical device components according to an example of the present disclosure.
Figure 8:
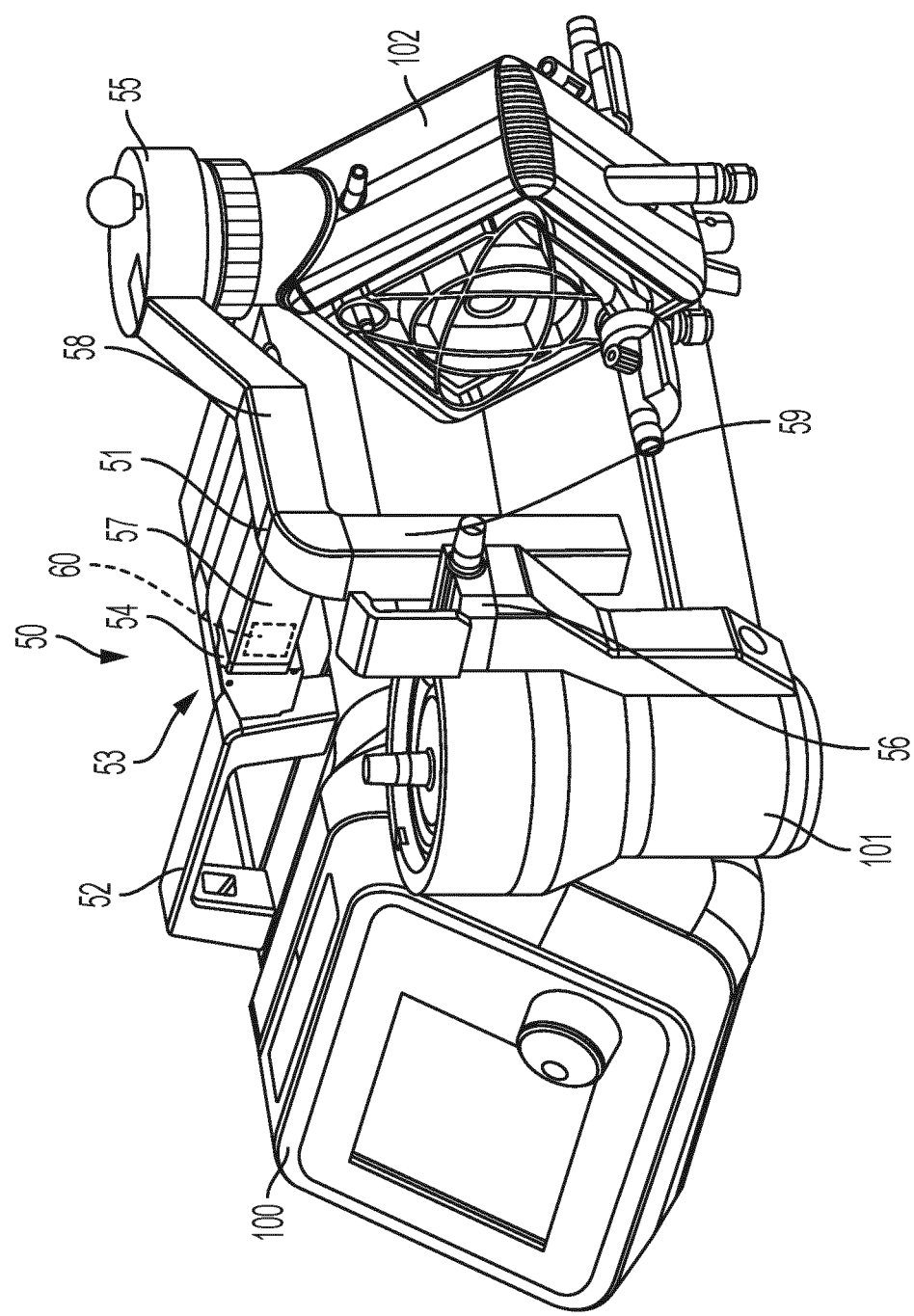
FIG. 8 is another perspective view of the holder system, control console support, and medical device components of FIG. 7.

With reference to FIGS. 7 and 8, a holder system 50 for mounting medical device components 101, 102 on a control console support 100 is shown in accordance with a non-limiting example of the present disclosure. The holder system 50 may thus have a triplex configuration and includes a holder arm 51 configured to be connected to and support at least one medical device component 101, 102 on the control console support 100, and a receiver 52, in the form of a handle or handgrip for the control console support 100, configured to be connected to the holder arm 51. The receiver 52 is configured to be attached to the control console support 100 to mount the holder arm 51 and the at least one medical device component 101, 102 on the control console support 100. According to the example, the holder arm 51 is configured in a similar manner to the holder arm 11 discussed above with reference to FIGS. 1-4 and includes receptacles 55, 56 for connecting two medical device components 101, 102 to the holder arm 51. The holder arm 51 includes a first arm portion 57 connected to the receiver 52, a second arm portion 58 with the first receptacle 55 disposed at an end thereof, and a third arm portion 59 with the second receptacle 56 disposed at an end thereof. In accordance with this disclosure, the first arm portion 57 may be straight or curved, the second arm portion 58 may be straight, or have a distal laterally curved portion, or it may have a two straight portions connected together by an upwards angled portion, and the third arm portion 59 may have a proximal portion that is either straight or curved downwards and a distal portion that has either a 90 degree curve or that has a twisted J-shape. In accordance with a non-limiting embodiment of this disclosure, the receptacle 55 is disposed at the end of the second arm portion 58 so as to be oriented downwards so as to connect with an upper portion of the oxygenator 102 so that the oxygenator hangs below the receptacle 55, and/or the receptacle 56 is disposed at the end of the third arm portion 21 so as to be oriented in a lateral direction that is perpendicular, or nearly perpendicular, to the downwards orientation of the receptacle 55 so that the receptacle 56 connects with a side portion of the pump drive and/or centrifugal blood pump 101 so that the pump drive and/or centrifugal blood pump 101 hangs from the third arm portion 21.

The holder system 50 also includes a locking assembly 53 configured to releasably connect the holder arm 51 to the receiver 52. The locking assembly 53 may include a latch 60, shown schematically in FIG. 8, or other suitable locking mechanism, disposed at an end of the first arm portion 57 of the holder arm 51. The locking assembly 53 is configured to engage a protrusion 54 disposed on the receiver 52 to lock the holder arm 51 in a connection with the receiver 52 and release the holder arm 51 from the receiver 52. According to a non-limiting example, the locking assembly 53 is of a similar configuration to the locking assembly 13 discussed above with reference to FIGS. 1-4, but the recess and other locking components, such as the latch, are disposed on the holder arm 51, and the protrusion 54 is disposed on or connected to the receiver 52.

With reference to FIGS. 9 and 10, a holder system 70 for mounting medical device components 101, 102 on a control console support 100 is shown in accordance with a non-limiting example of the present disclosure. The holder system 70 includes a holder arm 71 configured to be connected to and support at least one medical device component 101, 102 on the control console support 100, and a receiver 72, in the form of a handle or handgrip for the control console support 100, configured to be connected to the holder arm 71. The receiver 72 is configured to be attached to the control console support 100 to mount the holder arm 71 and the at least one medical device component 101, 102 on the control console support 100. According to the example, the holder arm 71 is configured in a similar manner to the holder arm 11 discussed above with reference to FIGS. 1-4 and includes receptacles 77, 78 for connecting two medical device components 101, 102 to the holder arm 71.

The holder arm 71 may have a triplex configuration, and includes a first arm portion 79 connected to the receiver 72, a second arm portion 80 with the first receptacle 77 disposed at an end thereof, and a third arm portion 81 with the second receptacle 78 disposed at an end thereof. In accordance with this disclosure, the first arm portion 79 may be straight or curved, the second arm portion 80 may be straight, or have a distal laterally curved portion, or it may have a two straight portions connected together by an upwards angled portion, and the third arm portion 81 may have a proximal portion that is either straight or curved downwards and a distal portion that has either a 90 degree curve or that has a twisted J-shape. In accordance with a non-limiting embodiment of this disclosure, the receptacle 77 is disposed at the end of the second arm portion 80 so as to be oriented downwards so as to connect with an upper portion of the oxygenator 102 so that the oxygenator hangs below the receptacle 77, and/or the receptacle 78 is disposed at the end of the third arm portion 81 so as to be oriented in a lateral direction that is perpendicular, or nearly perpendicular, to the downwards orientation of the receptacle 78 so that the receptacle 78 connects with a side portion of the pump drive and/or centrifugal blood pump 101 so that the pump drive and/or centrifugal blood pump 101 hangs from the third arm portion 81.

A clamp mechanism 82 actuated by a hand screw 83 may be provided between the second arm portion 80 and the third arm portion 81 for removably connecting the second arm portion 80 and the second arm portion 81 to the first arm portion 79. The holder system 70 also includes a locking assembly 73 configured to releasably connect the holder arm 71 to the receiver 72. The locking assembly 73 includes a first part 74 disposed on an end of the first arm portion 79 of the holder arm 71, a second part 75, and at least one fastener 76 configured to connect the first part 74 to the second part 75. As shown in FIGS. 9 and 10, the first part 74 and the second part 75 are configured to be engaged and fastened together around the receiver 72 in order to connect the holder arm 71 to the receiver 72. As evident from FIGS. 9 and 10, the locking assembly 73 releasably grips the receiver 72 of the control console support 100, wherein the receiver 72 constitutes a handle of the control console support 100. According to a non-limiting example, the locking assembly 73 is configured to permanently fasten the first arm portion 79 to the receiver 72. The clamp mechanism 82 can be actuated via the hand screw 83 to connect and disconnect the second arm portion 80 and the third arm portion 81 from the first arm portion 79.

Figure 13:
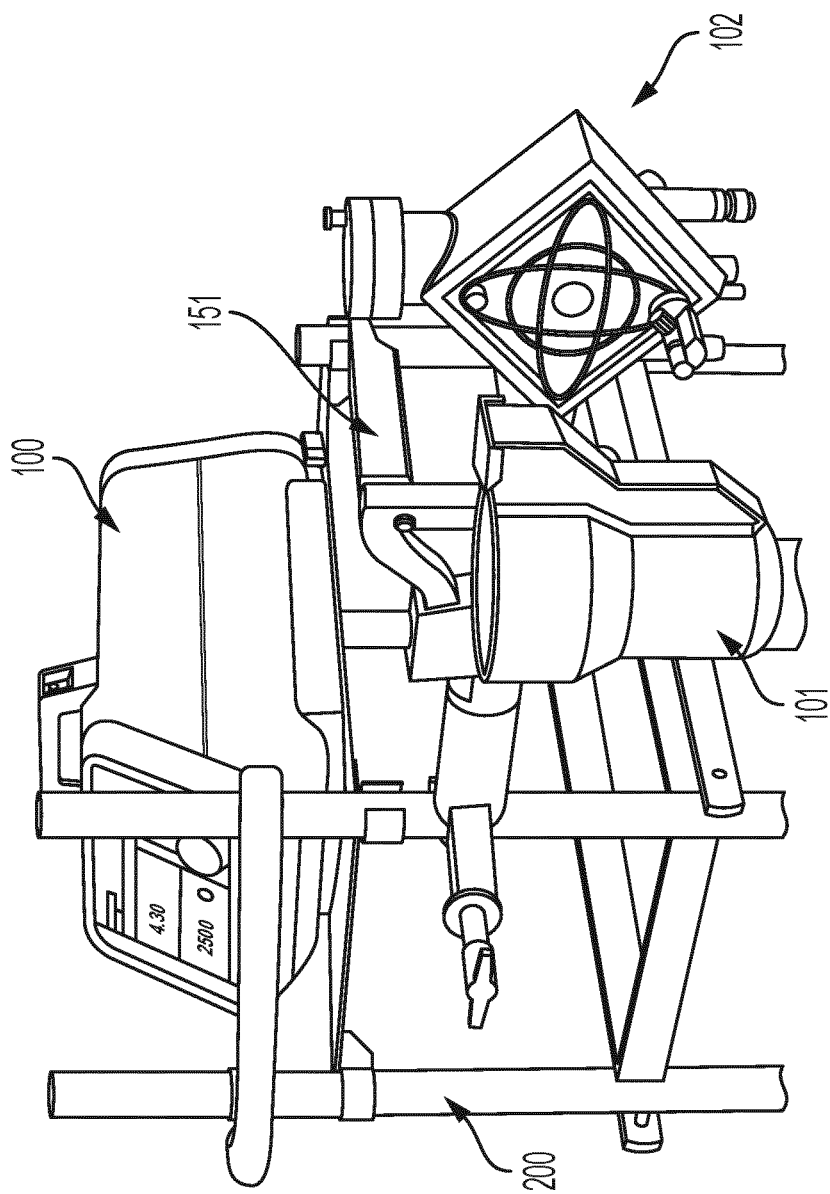
FIG. 13 is a perspective view of a holder system and control console support with the medical device components mounted thereon mounted to a sprinter cart according to an example of the present disclosure.

With reference to FIG. 13, according to one non-limiting example of the present disclosure, the holder arm 151 of the holder system 150 may be used to operatively connect the medical device components 101, 102 to a sprinter cart 200, which is a moveable cart having four wheels. In other non-limiting examples of the sprinter cart 200, the cart is provided with two wheels or with three wheels. In one non-limiting example of the present disclosure, the sprinter cart 200 may also be configured to provide support for the control console support 100 for transportation. One such example of a sprinter cart 200 is Getinge's Sprinter Cart XL.

It is to be understood that the invention, as defined by the claims, may assume various alternative variations and step sequences, except where expressly specified to the contrary. It is also to be understood that the specific devices and processes illustrated in the attached drawings and described in the specification are simply non-limiting exemplary embodiments or aspects of the invention. Although various non-limiting embodiments of the invention has been described in detail for the purpose of illustration based on what are currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope thereof. For example, it is to be understood that the present invention, as defined by the claims, contemplates that to the extent possible, one or more features of any embodiment or aspect can be combined with one or more features of any other embodiment or aspect.

The invention claimed is:

1. A portable medical device system comprising:
   at least a first medical device component and a second medical device component;
   a medical device control console configured to transmit control communication to, and to receive sensor and data feedback from, at least one of the first medical device component and the second medical device component; and
   a holder system configured to mount the first medical device component and the second medical device component to the medical device control console, the holder system comprising:
   a holder arm configured to releasably connect to the first medical device component and the second medical device component;
   a receiver configured to connect to the holder arm, wherein the receiver is attached to the medical device control console; and
   a locking assembly configured to releasably connect the holder arm to the receiver;
   wherein the receiver comprises a handle or handgrip attached to the control console.

2. The portable medical device system according to claim 1, wherein the locking assembly comprises a latch disposed within the receiver, a recess formed in the receiver and a moveable latching arm operably connected to move the latch,
   wherein the holder arm comprises a protrusion at an end thereof configured to be inserted into the recess, and
   wherein the latching arm is movable to engage and disengage the protrusion on the holder arm via the latch when the protrusion is received within the recess to lock the holder arm in a connection with the receiver and release the holder arm from the receiver by moving the latching arm between a first position and a second position.

3. The portable medical device system according to claim 1, wherein the locking assembly comprises a latch disposed within the holder arm, wherein the latch is moveable between a first position and a second position so as to engage a protrusion disposed on the receiver to lock the holder arm in a connection with the receiver and to release the holder arm from the receiver.

4. The portable medical device system according to claim 1, wherein the locking assembly comprises a first part disposed on an end of the holder arm, a second part, and at least one fastener configured to connect the first part to the second part, and
   wherein the first part and the second part are configured to be fastened together around the receiver so as to grip the receiver.

5. The portable medical device system according to claim 1, wherein the first medical device component comprises a medical blood pump and the second medical device component comprises an oxygenator.

6. A portable medical device system comprising:
   at least a first medical device component and a second medical device component;
   a medical device control console configured to transmit control communication to, and to receive sensor and data feedback from, at least one of the first medical device component and the second medical device component; and
   a holder system configured to mount the first medical device component and the second medical device component to the medical device control console, the holder system comprising:

a holder arm configured to releasably connect to the first medical device component and the second medical device component;

a receiver configured to connect to the holder arm, wherein the receiver is attached to the medical device control console; and a locking assembly configured to releasably connect the holder arm to the receiver;

wherein the holder arm has a triplex configuration and comprises a first receptacle configured to connect the first medical device component to the holder arm and a second receptacle configured to connect the second medical device component to the holder arm.

7. The portable medical device system according to claim 6, wherein the triplex holder arm comprises a first arm portion configured to engage with the locking assembly, a second arm portion extending from the first arm portion and configured to connect to the first medical device component, and a third arm portion extending from the first arm portion and configured to connect to the second medical device component, wherein the triplex holder arm is configured to maintain a relative position between the first medical device component and the second medical device component suitable for patient transport.

8. The portable medical device system according to claim 6, wherein the second receptacle is oriented downwards and connects to an upper portion of the second medical device component so the second medical device component hangs below the second receptacle, and the first receptacle is oriented laterally so as to be perpendicular, or nearly perpendicular, to the second receptacle and connects to a side portion of the first medical device component so the first medical device component hangs from the second arm portion.

9. The portable medical device system according to claim 1, wherein the holder arm comprises a first arm portion configured to engage with the locking assembly, a second arm portion extending from the first arm portion configured to connect to one of the two medical device components, and a third arm portion extending from the first arm portion configured to connect to another of the two medical device components, wherein the holder arm is configured to maintain a relative position between the two medical device components suitable for placing the two medical device components in fluid communication with each other via one or more sections of tubing and/or for placing the two medical device components in electrical communication with each other and/or for placing the two medical device components in electrical communication with the medical device control console via one or more communications wires.

10. The portable medical device system according to claim 6:

wherein the first medical device component comprises a medical blood pump and the second medical device component comprises an oxygenator.

11. A portable medical device system comprising:

at least a first medical device component and a second medical device component;

a medical device control console configured to transmit control communication to, and to receive sensor and data feedback from, at least one of the first medical device component and the second medical device component; and a holder system configured to mount the first medical device component and the second medical device component to the medical device control console, the holder system comprising:

a holder arm configured to releasably connect to the first medical device component and the second medical device component;

a receiver configured to connect to the holder arm, wherein the receiver is attached to the medical device control console; and a locking assembly configured to releasably connect the holder arm to the receiver;

wherein the holder arm has a multiplex configuration.

12. The portable medical device system according to claim 11:

wherein the first medical device component comprises a medical blood pump and the second medical device component comprises an oxygenator.

* * * * *